United States Patent
Choi et al.

(10) Patent No.: US 8,971,945 B2
(45) Date of Patent: Mar. 3, 2015

(54) SYSTEM AND METHOD USING A RATE SPLIT SCHEME BASED ON COOPERATION BETWEEN RECEIVERS

(71) Applicant: Samsung Electronics Co., Ltd., Suwon-si (KR)

(72) Inventors: Hyun Ho Choi, Suwon-si (KR); Pramod Viswanath, Urbana, IL (US); Chang Yong Shin, Seoul (KR); Won Jong Noh, Yongin-si (KR); Won-Jae Shin, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 86 days.

(21) Appl. No.: 13/783,522

(22) Filed: Mar. 4, 2013

(65) Prior Publication Data
US 2013/0182689 A1 Jul. 18, 2013

Related U.S. Application Data

(62) Division of application No. 12/830,261, filed on Jul. 2, 2010, now Pat. No. 8,412,252.

(60) Provisional application No. 61/291,525, filed on Dec. 31, 2009.

(30) Foreign Application Priority Data

Jan. 7, 2010 (KR) .................. 10-2010-0001162

(51) Int. Cl.
*H04B 7/185* (2006.01)
*H04B 7/00* (2006.01)
*H04W 72/04* (2009.01)
*H04W 52/24* (2009.01)
*H04W 52/40* (2009.01)

(52) U.S. Cl.
CPC ........ *H04W 72/0446* (2013.01); *H04W 52/243* (2013.01); *H04W 52/40* (2013.01)
USPC .......................... 455/517; 455/522; 370/318

(58) Field of Classification Search
USPC .......................................... 455/522; 370/318
See application file for complete search history.

(56) References Cited

U.S. PATENT DOCUMENTS

| | | | | |
|---|---|---|---|---|
| 6,477,368 | B1 * | 11/2002 | Korneluk et al. | 455/423 |
| 6,567,670 | B1 * | 5/2003 | Petersson | 455/522 |
| 7,342,958 | B2 | 3/2008 | Das et al. | |
| 8,472,542 | B1 * | 6/2013 | Wang et al. | 375/260 |

(Continued)

OTHER PUBLICATIONS

Raja et al., "Diversity-Multiplexing Tradeoff of the Two-User Interference Channel," *In Proceedings of the 2009 IEEE International Conference on Symposium on Information Theory*, Sep. 8, 2009, vol. 3, IEEE Press, Piscataway, NJ, USA, pp. 1599-1603.

(Continued)

*Primary Examiner* — Bobbak Safaipour
(74) *Attorney, Agent, or Firm* — NSIP Law

(57) ABSTRACT

Each of a first transmitter and a second transmitter uses a rate split scheme. Each of the first transmitter and the second transmitter may transmit at least four sub-messages, and different transmission powers may be allocated to the at least four sub-messages. Also, each of receivers may cooperate with each other, may share sub-messages that act as interferences, and may extract desired messages using the shared sub-messages.

7 Claims, 16 Drawing Sheets

(56) References Cited

U.S. PATENT DOCUMENTS

| | | | | |
|---|---|---|---|---|
| 8,548,101 | B2* | 10/2013 | Gong | 375/340 |
| 8,687,726 | B2* | 4/2014 | De Rosny et al. | 375/267 |
| 8,731,461 | B2* | 5/2014 | Crilly, Jr. | 455/7 |
| 2004/0066761 | A1* | 4/2004 | Giannakis et al. | 370/329 |
| 2005/0221757 | A1* | 10/2005 | Karabinis | 455/12.1 |
| 2007/0291867 | A1 | 12/2007 | Khan et al. | |
| 2009/0271048 | A1* | 10/2009 | Wakamatsu | 700/296 |
| 2011/0075604 | A1* | 3/2011 | Fong et al. | 370/328 |
| 2011/0159897 | A1* | 6/2011 | Choi et al. | 455/501 |

OTHER PUBLICATIONS

Etkin et al., "Gaussian Interference Channel Capacity to Within One Bit: the General Case," *In Procedings of the IEEE International Symposium on Information Theory (ISIT 2007)*, Jun. 2007, pp. 2181-2185.

Marić et al., "On the Capacity of Interface Channels with One Cooperating Transmitter," *CoRR: Computer Research Repository*, 2007, vol. abs/0710.3375, Located:http://arxiv.org/abs/0710.3375.

Prabhakaran et al., "Interference Channels with Destination Cooperation," *CoRR: Computer Research Repository*, 2009, vol. abs/0907.2702, Located: http://arxiv.org/abs/0907.2702.

\* cited by examiner

- IN I-1ᵗʰ TIME SLOT -

SYSTEM AND METHOD USING A RATE SPLIT SCHEME BASED ON COOPERATION BETWEEN RECEIVERS

CROSS-REFERENCE TO RELATED APPLICATIONS

This application is a divisional of U.S. patent application Ser. No. 12/830,261, filed on Jul. 2, 2010, which claims the benefit under 35 U.S.C. §119(e) of U.S. Provisional Application No. 61/291,525, filed on Dec. 31, 2009, in the U.S. Patent and Trademark Office, and claims the benefit under 35 U.S.C. §119(a) of Korean Patent Application No. 10-2010-0001162, filed on Jan. 7, 2010, in the Korean Intellectual Property Office, the entire disclosure of each of which is incorporated herein by reference for all purposes.

BACKGROUND

1. Field

The following description relates to a communication system and a communication method that use a rate split scheme.

21. Description of Related Art

There are a variety of methods for processing/eliminating interference in a wireless communication system and a variety of methods for improving the capacity of the communication system in an environment where an interference channel exists.

For example, when the strength of an interference signal is weak, a receiver may regard the interference as a noise and may decode a received signal to extract a desired signal. Conversely, when the strength of the interference signal is strong, the receiver may decode the interference first, eliminate the interference from the received signal, and subsequently extract a desired signal.

When the strength of the interference signal is moderate, a method known as a Han-Kobayashi may be used to remove interference. According to the Han-Kobayashi method, a transmitter may split a transmission message into a common message and a private message. The transmitter may apply a superposition-coding to the common message and the private message, and may transmit the superposition-coded message. The transmitter may be have a corresponding receiver, and the common message refers to a message that is decodable in an adjacent receiver in addition to the receiver corresponding to the transmitter. The private message is a message that is decodable only in the receiver corresponding to the transmitter. A scheme of splitting the transmission message into at least two messages and then allocating different rates or different transmission powers to the at least two messages, is generally referred to as a rate split scheme.

SUMMARY

In one general aspect, there is provided a communication method of a transmitter, the method comprising: generating a transmission message comprising: a $1\text{-}1\text{-}(i-1)^{th}$ sub-message; a $2\text{-}1\text{-}(i-1)^{th}$ sub-message; a $2\text{-}1\text{-}(i)^{th}$ sub-message; and a $3\text{-}1\text{-}(i-1)^{th}$ sub-message in a $(i-1)^{th}$ time slot; allocating transmission powers A, B, C, and D [W], respectively, in the transmission message of the $(i-1)^{th}$ time slot, A, B, C, and D denoting real numbers and A>B>C>D, to: the $1\text{-}1\text{-}(i-1)^{th}$ sub-message; the $2\text{-}1\text{-}(i-1)^{th}$ sub-message; the $2\text{-}1\text{-}(i)^{th}$ sub-message; and the $3\text{-}1\text{-}(i-1)^{th}$ sub-message; and generating a transmission message comprising the $2\text{-}1\text{-}(i)^{th}$ sub-message in a $(i)^{th}$ time slot.

The method may further include allocating a transmission power B to the $2\text{-}1\text{-}(i)^{th}$ sub-message in the transmission message in the $(i)^{th}$ time slot.

The method may further include determining the transmission powers A, B, C, and D based on information associated with an interference channel of a corresponding transmission/reception pair and information associated with an interference channel of an adjacent transmission/reception pair.

The method may further include: cooperating with the adjacent transmission/reception pair; and collecting information associated with the interference channels.

The method may further include that the allocating allocates the transmission powers A, B, C, and D, respectively, to enable a receiver of the adjacent transmission/reception pair to: succeed in decoding of the $1\text{-}1\text{-}(i-1)^{th}$ sub-message and the $2\text{-}1\text{-}(i-1)^{th}$ sub-message from the transmission message in the $(i-1)^{th}$ time slot; and fail in decoding of the $2\text{-}1\text{-}(1)^{th}$ sub-message and the $3\text{-}1\text{-}(i-1)^{th}$ sub-message from the transmission message in the $(i-1)^{th}$ time slot.

The method may further include that the allocating allocates the transmission powers A, B, C, and D, respectively, to enable a receiver corresponding to the transmitter to succeed in decoding of the $1\text{-}1\text{-}(i-1)^{th}$ sub-message, the $2\text{-}1\text{-}(i-1)^{th}$ sub-message, the $2\text{-}1\text{-}(1)^{th}$ sub-message, and the $3\text{-}1\text{-}(i-1)^{th}$ sub-message from the transmission message in the $(i-1)^{th}$ time slot.

The method may further include that the allocating allocates the transmission power B to the $2\text{-}1\text{-}(i)^{th}$ sub-message to enable a receiver of the adjacent transmission/reception pair to succeed in decoding of the $2\text{-}1\text{-}(1)^{th}$ sub-message from the transmission message in the $(i)^{th}$ time slot.

In another general aspect, there is provided a communication method of a receiver corresponding to a second transmitter, the method comprising: receiving a $1\text{-}1\text{-}(i-1)^{th}$ sub-message and a $2\text{-}1\text{-}(i-1)^{th}$ sub-message from among the $1\text{-}1\text{-}(i-1)^{th}$ sub-message, the $2\text{-}1\text{-}(i-1)^{th}$ sub-message, a $2\text{-}1\text{-}(i)^{th}$ sub-message, and a $3\text{-}1\text{-}(i-1)^{th}$ sub-message transmitted from a first transmitter based on different transmission powers in a $(i-1)^{th}$ time slot; receiving a $1\text{-}2\text{-}(i-1)^{th}$ sub-message, a $2\text{-}2\text{-}(i-1)^{th}$ sub-message, a $2\text{-}2\text{-}(i)^{th}$ sub-message, and a $3\text{-}2\text{-}(i-1)^{th}$ sub-message transmitted from the second transmitter based on different transmission powers in the $(i-1)^{th}$ time slot; decoding the $1\text{-}2\text{-}(i-1)^{th}$ sub-message and the $2\text{-}2\text{-}(i-1)^{th}$ sub-message; eliminating the $1\text{-}2\text{-}(i-1)^{th}$ sub-message and the $2\text{-}2\text{-}(i-1)^{th}$ sub-message from the received sub-messages; and providing, to a receiver corresponding to the first transmitter, the $1\text{-}1\text{-}(i-1)^{th}$ sub-message, the $2\text{-}1\text{-}(i-1)^{th}$ sub-message, the $2\text{-}2\text{-}(i)^{th}$ sub-message and the $3\text{-}2\text{-}(i-1)^{th}$ sub-message.

The method may further include: estimating an interference channel between the first transmitter and the receiver corresponding to the second transmitter; and reporting information associated with the interference channel to at least one of the first transmitter and the second transmitter.

The method may further include that the providing performs: adjusting a time synchronization or a phase synchronization of each of the $1\text{-}1\text{-}(i-1)^{th}$ sub-message, the $2\text{-}1\text{-}(i-1)^{th}$ sub-message, the $2\text{-}2\text{-}(i)^{th}$ sub-message, and the $3\text{-}2\text{-}(i-1)^{th}$ sub-message; and providing, as an analog signal, the $1\text{-}1\text{-}(i-1)^{th}$ sub-message, the $2\text{-}1\text{-}(i-1)^{th}$ sub-message, the $2\text{-}2\text{-}(i)^{th}$ sub-message, and the $3\text{-}2\text{-}(i-1)^{th}$ sub-message, to the receiver corresponding to the first transmitter.

The method may further include that: transmission powers of the $1\text{-}1\text{-}(i-1)^{th}$ sub-message, the $2\text{-}1\text{-}(i-1)^{th}$ sub-message, the $2\text{-}1\text{-}(i)^{th}$ sub-message, and the $3\text{-}1\text{-}(i-1)^{th}$ sub-message transmitted in the $(i-1)^{th}$ time slot are transmission powers A, B, C, and D [W], respectively; A, B, C, and D denote real numbers; and A>B>C>D.

In another general aspect, there is provided a communication method of a receiver corresponding to a first transmitter, the method comprising: distinguishing a $1\text{-}1\text{-}(i-1)^{th}$ sub-message, a $2\text{-}1\text{-}(i-1)^{th}$ sub-message, and a $2\text{-}2\text{-}(i)^{th}$ sub-message from among the $1\text{-}1\text{-}(i-1)^{th}$ sub-message, the $2\text{-}1\text{-}(i-1)^{th}$ sub-message, the $2\text{-}2\text{-}(i)^{th}$ sub-message, and a $3\text{-}2\text{-}(i-1)^{th}$ sub-message transmitted from a receiver corresponding to a second transmitter, in response to: the first transmitter transmitting the $1\text{-}1\text{-}(i-1)^{th}$ sub-message, the $2\text{-}1\text{-}(i-1)^{th}$ sub-message, the $2\text{-}1\text{-}(i)^{th}$ sub-message, and a $3\text{-}1\text{-}(i-1)^{th}$ sub-message; and the second transmitter transmitting the $1\text{-}2\text{-}(i-1)^{th}$ sub-message, the $2\text{-}2\text{-}(i-1)^{th}$ sub-message, the $2\text{-}2\text{-}(i)^{th}$ sub-message, and a $3\text{-}2\text{-}(i-1)^{th}$ sub-message in an $(i-1)^{th}$ time slot; receiving a $1\text{-}1\text{-}(i)^{th}$ sub-message, the $2\text{-}1\text{-}(i)^{th}$ sub-message, a $2\text{-}1\text{-}(i+1)^{th}$ sub-message, and a $3\text{-}1\text{-}(i)^{th}$ sub-message from the first transmitter in an $(i)^{th}$ time slot; receiving a $1\text{-}2\text{-}(i)^{th}$ sub-message, and the $2\text{-}2\text{-}(i)^{th}$ sub-message from the second transmitter in the $(i)^{th}$ time slot; and extracting the $1\text{-}1\text{-}(i)^{th}$ sub-message, the $2\text{-}1\text{-}(i)^{th}$ sub-message, and the $3\text{-}1\text{-}(i)^{th}$ sub-message from the sub-messages received in the $(i)^{th}$ time slot, using the $1\text{-}2\text{-}(i)^{th}$ sub-message and the $2\text{-}2\text{-}(i)^{th}$ sub-message received from the receiver corresponding to the second transmitter.

The method may further include that the extracting performs: extracting the $1\text{-}1\text{-}(i)^{th}$ sub-message and the $2\text{-}1\text{-}(i)^{th}$ sub-message based on a transmission power of each of the sub-messages received in the $(i)^{th}$ time slot; and eliminating the $1\text{-}2\text{-}(i)^{th}$ sub-message from remaining sub-messages, excluding the $1\text{-}1\text{-}(i)^{th}$ sub-message and the $2\text{-}1\text{-}(i)^{th}$ sub-message among the sub-messages received in the $(i)^{th}$ time slot.

The method may further include that the extracting sequentially eliminates the $2\text{-}1\text{-}(i+1)^{th}$ sub-message and the $1\text{-}2\text{-}(i)^{th}$ sub-message to extract the $3\text{-}1\text{-}(i)^{th}$ sub-message, after the $1\text{-}2\text{-}(i)^{th}$ sub-message is eliminated from the remaining sub-messages.

A non-transitory computer-readable recording medium may store a program implementing any of the above methods.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a to comprehensive understanding of the methods, apparatuses, and/or systems described herein. Accordingly, various changes, modifications, and equivalents of the methods, apparatuses, and/or systems described herein may be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

Figure 1:
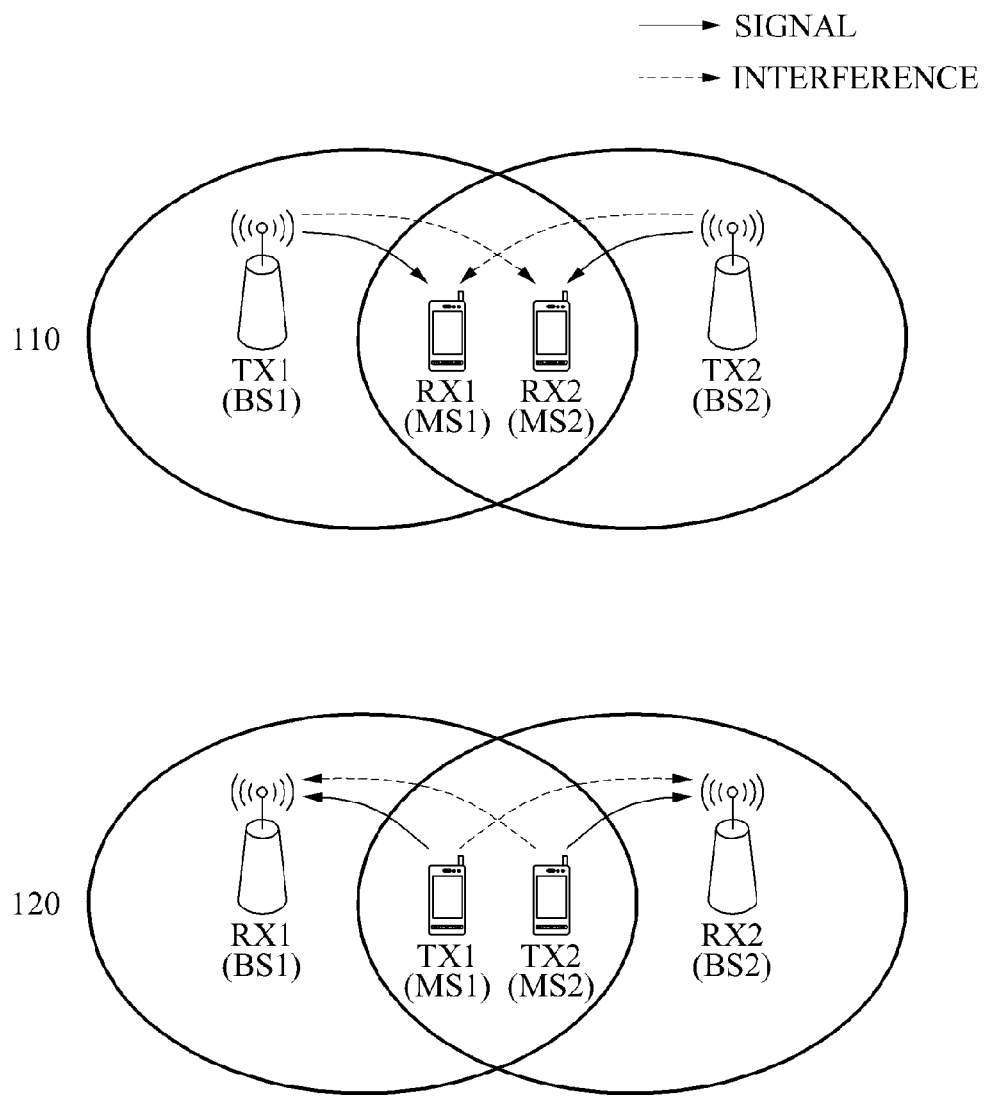
FIG. 1 is a diagram illustrating an example of a communication system including two transmission/reception pairs.

FIG. 1 illustrates an example of a communication system including two transmission/reception pairs.

Referring to an example 110, each of two base stations (BS1 and BS2) acts as a transmitter in a downlink communication, and each of two terminals (MS1 and MS2) acts as a receiver. In this example, a signal transmitted from the BS1 may act as an interference to the MS2, and a signal transmitted from the BS2 may act as an interference to the MS1.

Referring to an example 120, each of two terminals (MS1 and MS2) acts as a transmitter, and each of two base stations (BS1 and BS2) may act as a receiver. In this example, a signal transmitted from the MS1 may act as an interference to the BS2, and a signal transmitted from the MS2 may act as an interference to the BS1.

Figure 2:
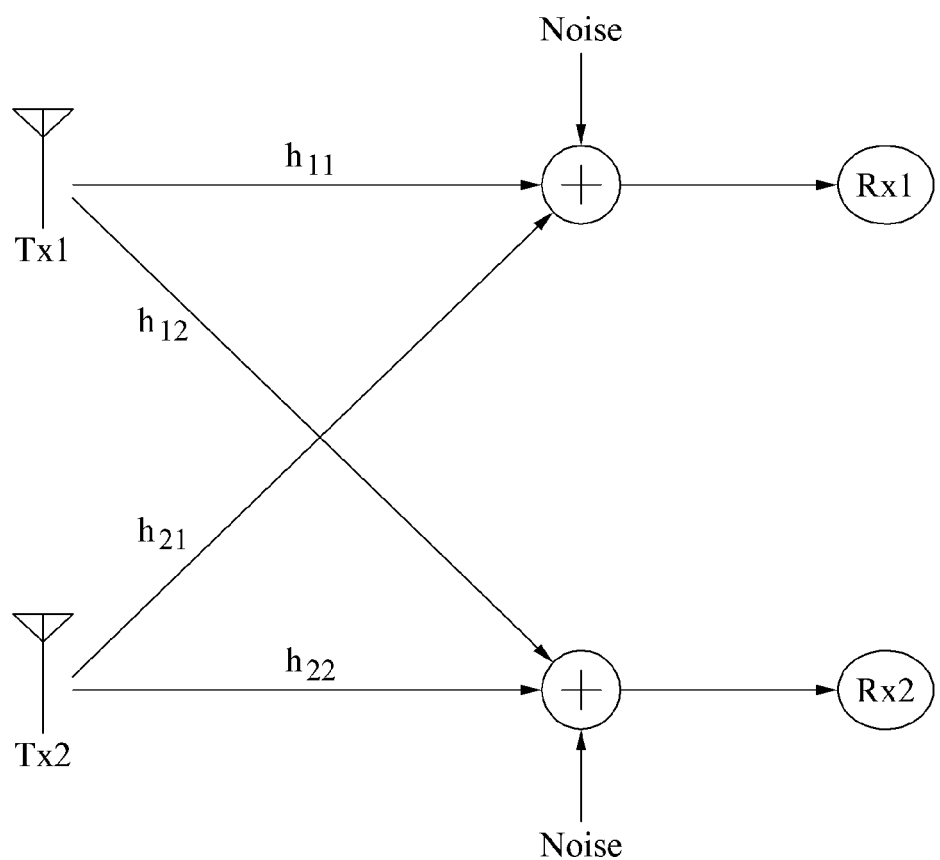
FIG. 2 is a diagram illustrating an example of a channel model associated with two transmission/reception pairs.

The communication system including the two transmission/reception pairs of FIG. 1 may be expressed as a channel model in FIG. 2.

FIG. 2 illustrates an example of a channel model associated with two transmission/reception pairs.

Referring to FIG. 2, a transmitter 1 and a receiver 1 may construct a single transmission/reception pair and a transmitter 2 and a receiver 2 may construct another single transmission/reception pair. In one example, a signal channel between the transmitter 1 and the receiver 1 may be expressed as $h_{11}$, and a signal channel between the transmitter 2 and the receiver 2 may be expressed as $h_{22}$. An interference channel between the transmitter 1 and the receiver 2 may be expressed as $h_{12}$, and an interference channel between the transmitter 2 and the receiver 1 may be expressed as $h_{21}$. Here, a reception signal of each of the receivers may include a desired signal, an interference signal, and a noise.

A method of transmitting/receiving may be changed based on a status of the interference channels $h_{12}$ and $h_{21}$. Each of the receivers may regard the interference as a noise when a strength of an interference is weak, and the receivers may decode the reception signal. Each of the receivers may eliminate the interference from the reception signal when the strength of the interference is strong, and may decode the desired signal from the signal remaining. When the interference is moderate, a Han-Kobayashi method may be used. In one example, the Han-Kobayashi method may not always achieve an optimal performance.

Example embodiments suggest a rate split scheme of splitting a transmission message into at least four sub-messages in a single time slot. In one example, the at least four sub-messages included in the transmission message in the single time slot may include a part of sub-messages transmitted in a subsequent time slot.

Figure 3:
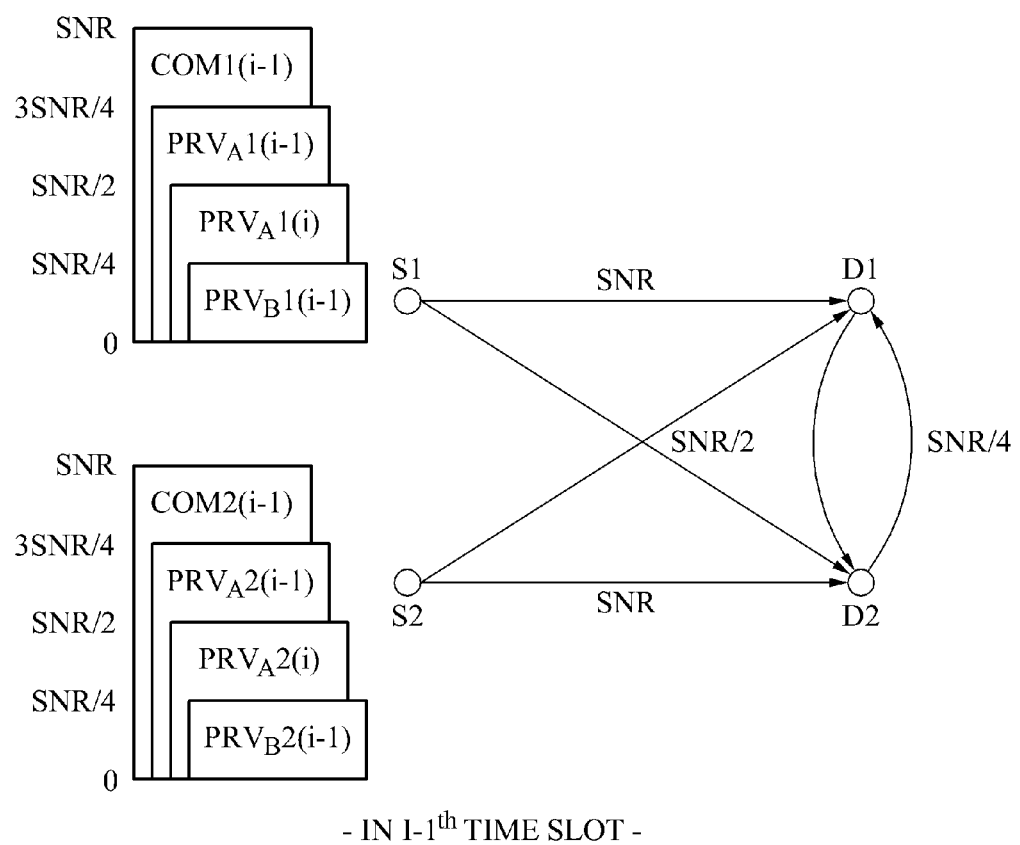
FIG. 3 is a diagram illustrating a plurality of sources that transmit sub-messages.

FIG. 3 illustrates an example of a plurality of sources that transmits sub-messages. In this example, each of a source 1 (S1) and a source 2 (S2) transmits four sub-messages in an i−1$^{th}$ time slot.

Referring to FIG. 3, the source 1 may construct a transmission message including a 1-1-(i−1)$^{th}$ sub-message (COM1(i−1)), a 2-1-(i−1)$^{th}$ sub-message(PRV$_A$1(i−1)), a 2-1-(i)$^{th}$ sub-message (PRV$_A$1(i)) and a 3-1-(i−1)$^{th}$ sub-message (PRV$_B$1(i−1)) in an i−1$^{th}$ time slot. The source 2 may construct a transmission message including a 1-2-(i−1)$^{th}$ sub-message (COM2(i−1)), a 2-2-(i−1)$^{th}$ sub-message (PRV$_A$2(i−1)), a 2-2-(i)$^{th}$ sub-message (PRV$_A$2(i)), and a 3-2-(i−1)$^{th}$ sub-message (PRV$_B$2(i−1)) in an i−1$^{th}$ time slot.

Here, a transmission power (or a transmission rate) of each of the 1-1-(i−1)$^{th}$ sub-message (COM1(i−1)), the 1-2-(i−1)$^{th}$ sub-message (COM2(i−1)), the 2-1-(i−1)$^{th}$ sub-message (PRV$_A$1(i−1)), and the 2-2-(i−1)$^{th}$ sub-message (PRV$_A$2(i−1)) may be set to be decoded by both the destination 1 (D1) and the destination 2 (D2), whereas a transmission power of each of the 2-1-(i)$^{th}$ sub-message (PRV$_A$1(i)), the 3-1-(i−1)$^{th}$ sub-message (PRV$_B$1(i−1)), the 2-2-(i)$^{th}$ sub-message (PRV$_A$2(i)), and the 3-2-(i−1)$^{th}$ sub-message (PRV$_B$2(i−1) may be set to be decoded by only a corresponding destination.

A transmission power of each of the sub-messages may be more precisely determined based on a status of two interference channels. For ease of description, it is presumed that a strength of each of signal channels is a signal-to-noise ratio (SNR), a strength of each interference channels is SNR/2, and a strength of a direct channel between the destination 1 and the destination 2 is SNR/4 in the descriptions of FIGS. 3 through 15.

A transmission power of each of the 1-1-(i−1)$^{th}$ sub-message (COM1(i−1)), the 2-1-(i−1)$^{th}$ sub-message (PRV$_A$1(i−1)), the 2-1-(i)$^{th}$ sub-message (PRV$_A$1(i)) and the 3-1-(i−1)$^{th}$ sub-message (PRV$_B$1(i−1)) may be set to be different from each other. In the same manner, a transmission power of each of the 1-2-(i−1)$^{th}$ sub-message (COM2(i−1)), the 2-2-(i−1)$^{th}$ sub-message (PRV$_A$2(i−1)), the 2-2-(i)$^{th}$ sub-message (PRV$_A$2(i)) and the 3-2-(i−1)th sub-message (PRV$_B$2(i−1)) may also be set to be different from each other. For example, when A, B, C, and D are real numbers, and A>B>C>D, transmission powers of the 1-1-(i−1)$^{th}$ sub-message (COM1(i−1)), the 2-1-(i−1)$^{th}$ sub-message (PRV$_A$1(i−1)), the 2-1-(i)$^{th}$ sub-message (PRV$_A$1(i)) and the 3-1-(i−1)$^{th}$ sub-message (PRV$_B$1(i−1)) may be A, B, C, D [W], respectively, and transmission powers of the 1-2-(i−1)$^{th}$ sub-message (COM2(i−1)), the 2-2-(i−1)$^{th}$ sub-message (PRV$_A$2(i−1)), the 2-2-(i)$^{th}$ sub-message (PRV$_A$2(i)) and the 3-2-(i−1)$^{th}$ sub-message (PRV$_B$2(i−1)) may also be A, B, C, D [W], respectively.

In FIGS. 3 through 15, it is presumed that transmission powers of the 1-1-(i−1)$^{th}$ sub-message (COM1(i−1)), the 2-1-(i−1)$^{th}$ sub-message (PRV$_A$1(i−1)), the 2-1-(i)$^{th}$ sub-message (PRV$_A$1(i)), and the 3-1-(i−1)$^{th}$ sub-message (PRV$_B$1(i−1)) may be SNR, 3SNR/4, SNR/2, SNR/4, respectively, and transmission powers of the 1-2-(i−1)$^{th}$ sub-message (COM2(i−1)), the 2-2-(i−1)$^{th}$ sub-message (PRV$_A$2(i−1)), the 2-2-(i)$^{th}$ sub-message (PRV$_A$2(i)), and 3-2-(i−1)$^{th}$ sub-message (PRV$_B$2(i−1)) may be SNR, 3SNR/4, SNR/2, SNR/4, respectively.

Figure 4:
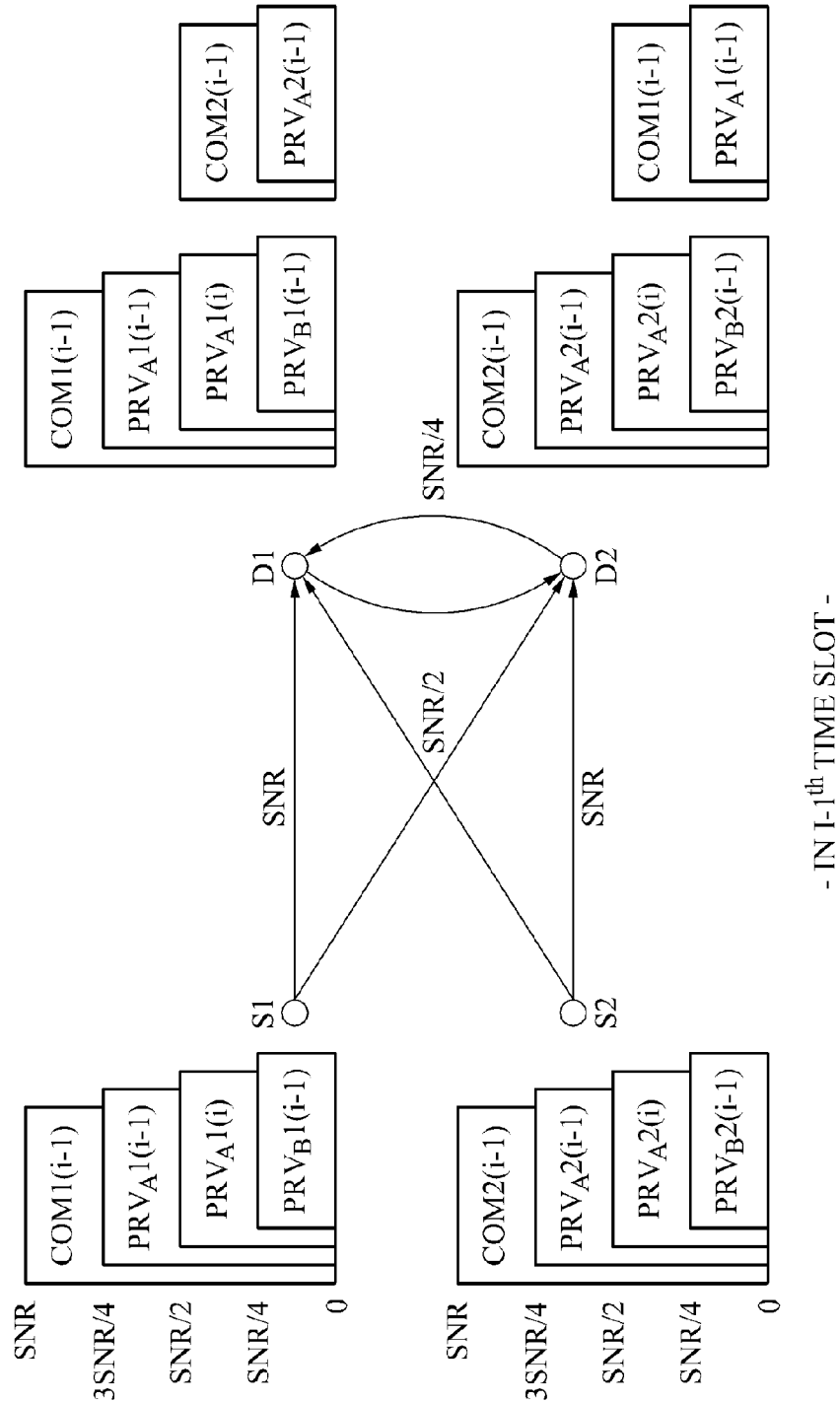
FIG. 4 is a diagram illustrating an example of a plurality of destinations that receive sub-messages transmitted from a plurality of sources.

When the strength of each of the channels and the transmission power of each of the sub-messages are presumed as described above, each of the destination 1 and the destination 2 may receive six sub-messages as illustrated in FIG. 4.

FIG. 4 illustrates an example of a plurality of destinations that receive sub-messages transmitted from a plurality of sources. In this example, destination 1 and destination 2 receive sub-messages transmitted from each of the source 1 and the source 2 in an i−1$^{th}$ time slot.

Referring to FIG. 4, each of the destination 1 and the destination 2 may receive six sub-messages from the source 1 and the source 2 in the i−1$^{th}$ time slot.

A strength of a channel between the destination 1 and the source 1 is SNR, and thus, the destination 1 may receive four sub-messages from the source 1. A strength of an interference channel between the destination 1 and the source 2 is SNR/2. Thus, the destination 1 may only receive a 1-2-(i−1)$^{th}$ sub-message (COM2(i−1)) and a 2-2-(i−1)$^{th}$ sub-message (PRV$_A$2(i−1)) from the source 2. A reception power of the destination 2 for a 2-2-(i)$^{th}$ sub-message (PRV$_A$2(i)) and a 3-2-(i−1)$^{th}$ sub-message (PRV$_B$2(i−1)) transmitted from the source 2 may decrease to a noise level, and thus, the 2-2-(i)$^{th}$ sub-message (PRV$_A$2(i)) and the 3-2-(i−1)$^{th}$ sub-message (PRV$_B$2(i−1)) may be regarded as a part of a noise.

A strength of a channel between the destination 2 and the source 2 is SNR, and thus, the destination 2 may receive all four sub-messages from the source 2, and a strength of an interference channel between the destination 2 and the source 1 is SNR/2. Thus, the destination 2 may only receive a 1-1-(i−1)$^{th}$ sub-message (COM1(i−1)), a 2-1-(i−1)$^{th}$ sub-message (PRV$_A$1(i−1)) from the source 1. In one example, a reception power for a 2-1-(i)$^{th}$ sub-message (PRV$_A$1(i)) and a 3-1-(i−1)$^{th}$ sub-message (PRV$_B$1(i−1)) transmitted from the source 1 may be decreased to a noise level, and thus, the 2-1-(i)$^{th}$ sub-message (PRV$_A$1(i)) and the 3-1-(i−1)$^{th}$ sub-message (PRV$_B$1(i−1)) may be regarded as a part of a noise.

A procedure where the source 2 processes received sub-messages will be described in detail with reference to FIGS. 5 and 6. The source 1 may perform in the same manner as the source 2.

Figure 5:
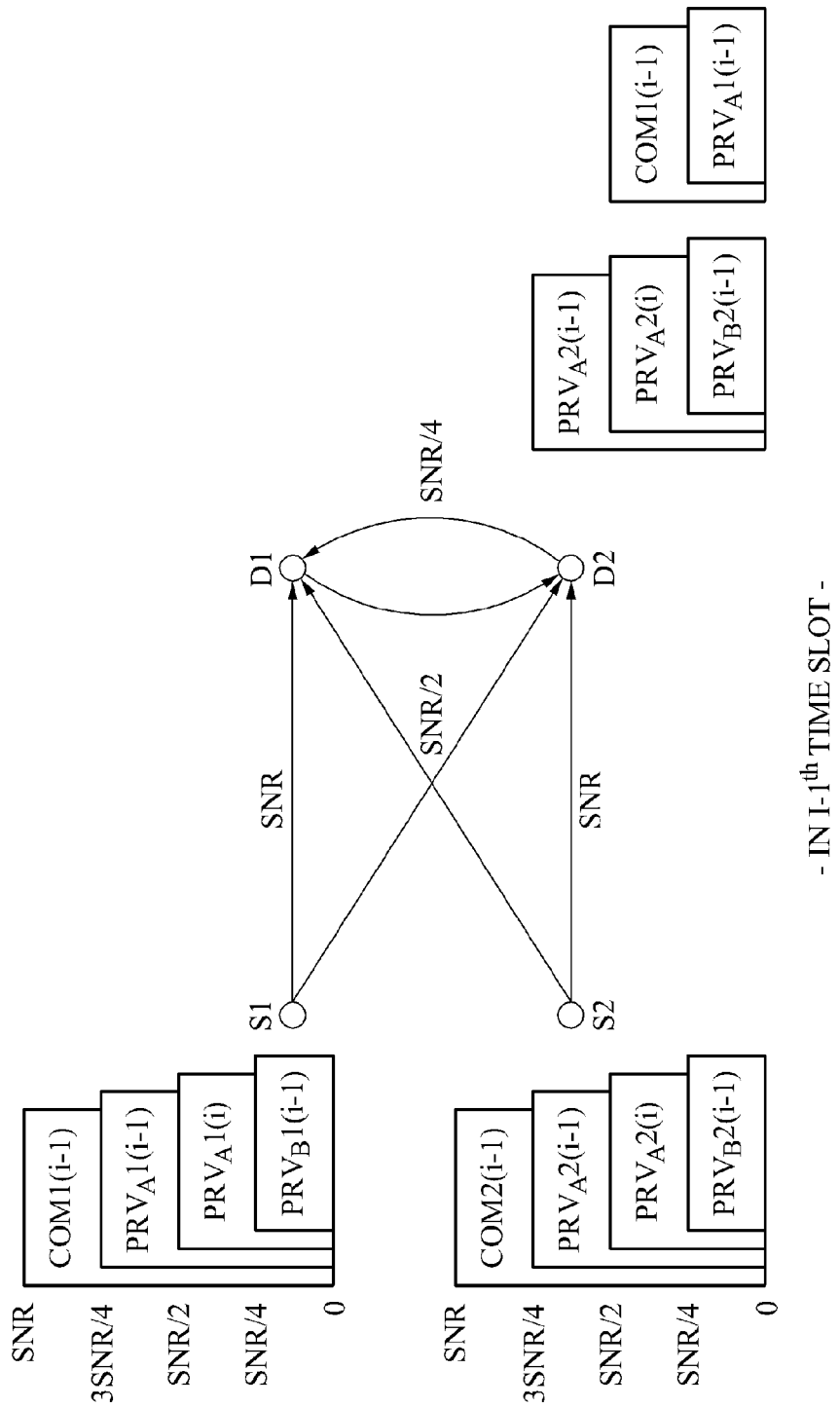
FIG. 5 is a diagram illustrating an example of a destination that removes a sub-message.

FIG. 5 illustrates an example of a destination that removes a sub-message. In this example, destination 2 removes a sub-message COM1(i−1) in an i−1$^{th}$ time slot.

Referring to FIG. 5, the destination 2 may decode a 1-2-(i−1)$^{th}$ sub-message (COM2(i−1)) having a highest power among received six sub-messages in the i−1$^{th}$ time slot. The destination 2 may identify the 1-2-(i−1)$^{th}$ sub-message (COM2(i−1)) having the highest power among the received six sub-messages, and may decode the 1-2-(i−1)$^{th}$ sub-message (COM2(i−1)) first. In one example, the destination 2 may regard remaining five sub-messages as a noise.

When the 1-2-(i−1)$^{th}$ sub-message (COM2(i−1)) is eliminated from the six sub-messages after the 1-2-(i−1)$^{th}$ sub-message (COM2(i−1)) is decoded, only five sub-messages remain in the destination 2 as illustrated in FIG. 5.

Figure 6:
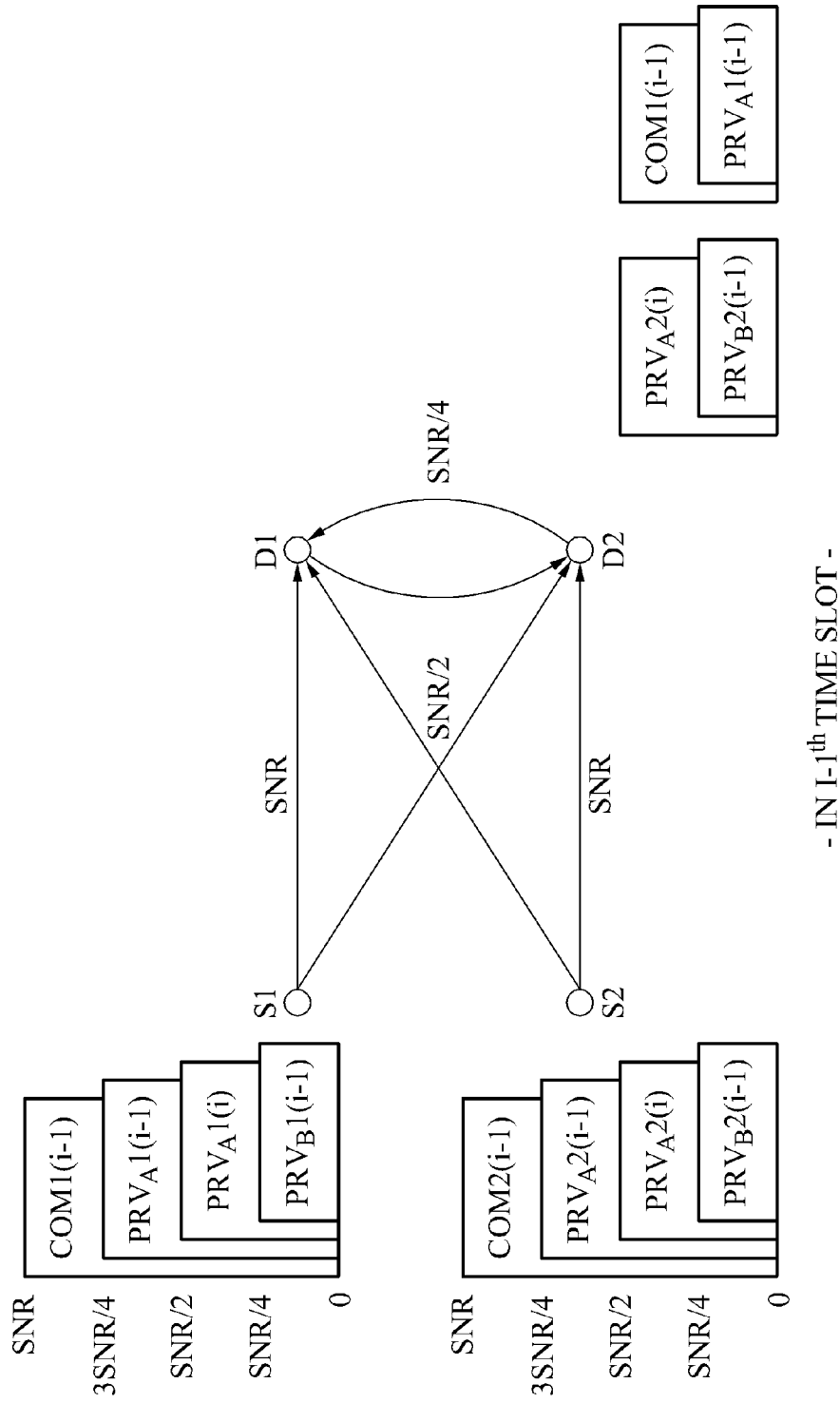
FIG. 6 is a diagram illustrating another example of a destination that removes a sub-message.

FIG. 6 illustrates another example of a destination that removes a sub-message. In this example, destination 2 removes a sub-message $PRV_A2(i-1)$ in an i−1$^{th}$ time slot.

Referring to FIG. 6, the destination 2 may decode a 2-2-(i−1)$^{th}$ sub-message ($PRV_A2(i-1)$) having a highest power among remaining five sub-messages in the i−1$^{th}$ time slot. In one example, the destination 2 may decode the 2-2-(i−1)$^{th}$ sub-message ($PRV_A2(i-1)$) while regarding remaining four sub-messages as a noise, and may eliminate the 2-2-(i−1)$^{th}$ sub-message ($PRV_A2(i-1)$).

When the 2-2-(i−1)$^{th}$ sub-message ($PRV_A2(i-1)$) is eliminated, only four sub-messages remain in the destination 2.

Although not illustrated in FIG. 6, the destination 1 may also sequentially decode and eliminate two sub-messages and only four sub-messages may remain in the destination 1.

Figure 7:
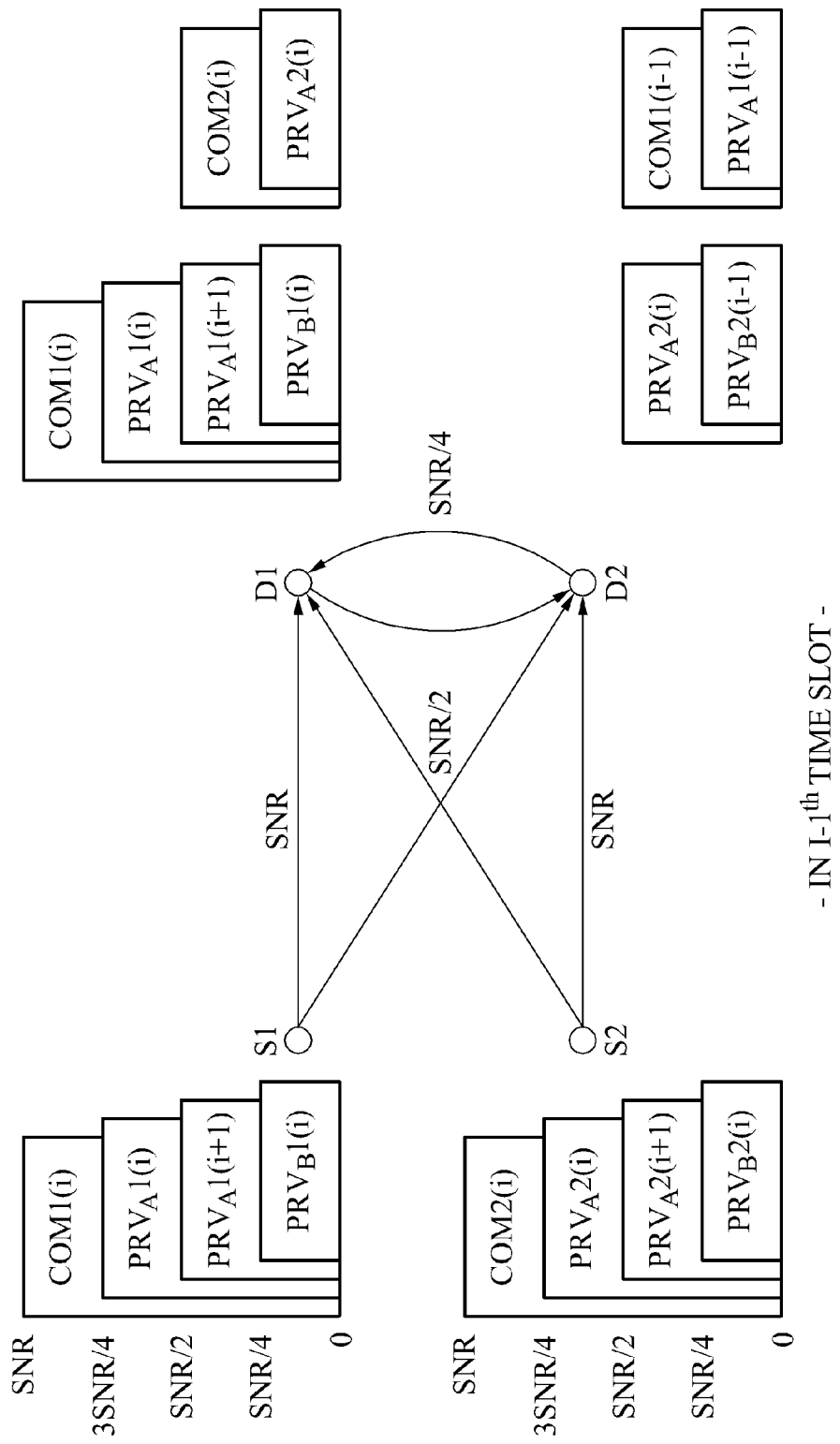
FIG. 7 is a diagram illustrating another example of a plurality of sources that transmit sub-messages.

FIG. 7 illustrates another example of a plurality of sources that transmit sub-messages. In this example, each of a source 1 and a source 2 transmits four sub-messages in an i−1$^{th}$ time slot.

Referring to FIG. 7, the source 1 may transmit a 1-1-(i)$^{th}$ sub-message (COM1(i)), a 2-1-(i)$^{th}$ sub-message ($PRV_A1(i)$), a 2-1-(i+1)$^{th}$ sub-message ($PRV_A1(i+1)$), and a 3-1-(i)$^{th}$ sub-message ($PRV_B1(i)$) in an i$^{th}$ time slot, and a source 2 may transmit a 1-2-(i)$^{th}$ sub-message (COM2(i)), a 2-2-(i)$^{th}$ sub-message ($PRV_A2(i)$), a 2-1-(i+1)$^{th}$ sub-message ($PRV_A2(i+1)$) and a 3-1-(i)$^{th}$ sub-message ($PRV_B2(i)$) in the i$^{th}$ time slot. In one example, the 2-1-(i)$^{th}$ sub-message ($PRV_A1(i)$) may be identical to a sub-message that is transmitted by the source 1 at a transmission power of SNR/2 in an i−1$^{th}$ time slot, and the 2-2-(i)$^{th}$ sub-message ($PRV_A2(i)$) may also be identical to a sub-message that is transmitted by the source 2 at the transmission power of SNR/2 in the i−1$^{th}$ time slot.

Each of a destination 1 and a destination 2 may receive six sub-messages in the same manner as in the i−1$^{th}$ time slot. A procedure where the destination 1 receives six sub-messages will be further described with reference to FIG. 7.

A strength of a channel between the destination 1 and the source 1 is SNR, and thus, the destination 1 may receive all the 1-1-(i)$^{th}$ sub-message (COM1(i)), the 2-1-(i)$^{th}$ sub-message ($PRV_A1(i)$), the 2-1-(i+1)$^{th}$ sub-message ($PRV_A1(i+1)$), and the 3-1-(i)$^{th}$ sub-message ($PRV_B1(i)$) from the source 1.

A strength of the channel between the destination 1 and the source 2 is SNR/2, and thus, the destination 1 may only receive the 1-2-(i)$^{th}$ sub-message (COM2(i)) and the 2-2-(i)$^{th}$ sub-message ($PRV_A2(i)$) from the source 2. A reception power of the 2-1-(i+1)$^{th}$ sub-message ($PRV_A2(i+1)$) and the 3-1-(i)$^{th}$ sub-message ($PRV_B2(i)$) may be decrease to a noise level.

Figure 8:
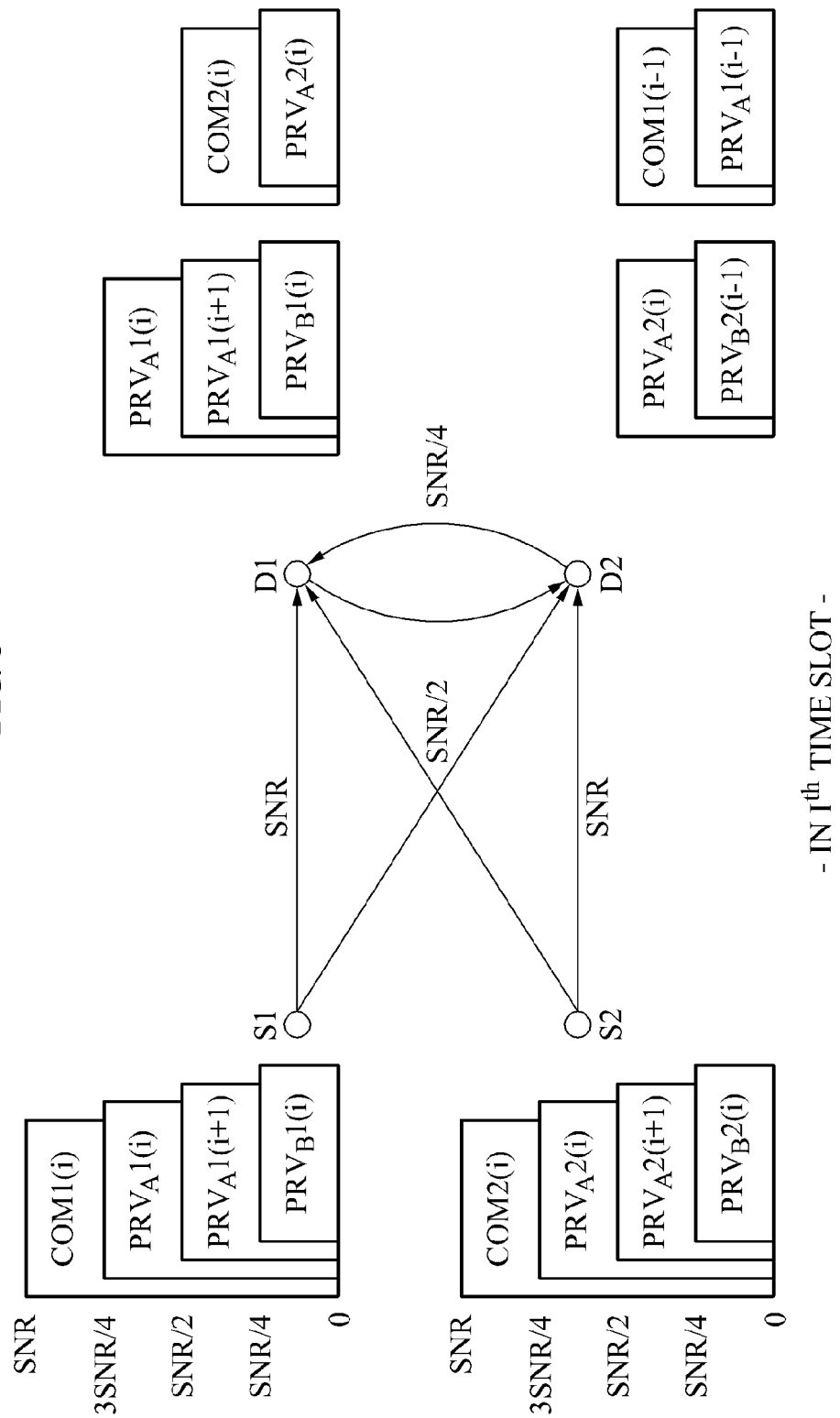
FIG. 8 is a diagram illustrating another example of a destination that removes a sub-message.

FIG. 8 illustrates another example of a destination that removes a sub-message. In this example, destination 1 removes a sub-message COM1(i) in an i$^{th}$ time slot.

Referring to FIG. 8, the destination 1 may decode a 1-1-(i)$^{th}$ sub-message (COM1(i)) having a highest power among six sub-message received from the source 1 and the source 2 in the i$^{th}$ time slot. In one example, the destination 1 may decode the 1-1-(i)$^{th}$ sub-message (COM1(i)) while regarding remaining five sub-messages as a noise, and may eliminate the 1-1-(i)$^{th}$ sub-message (COM1(i)).

When the 1-1-(i)$^{th}$ sub-message (COM1(i)) is eliminated, only five sub-messages remain in the destination 1.

Figure 9:
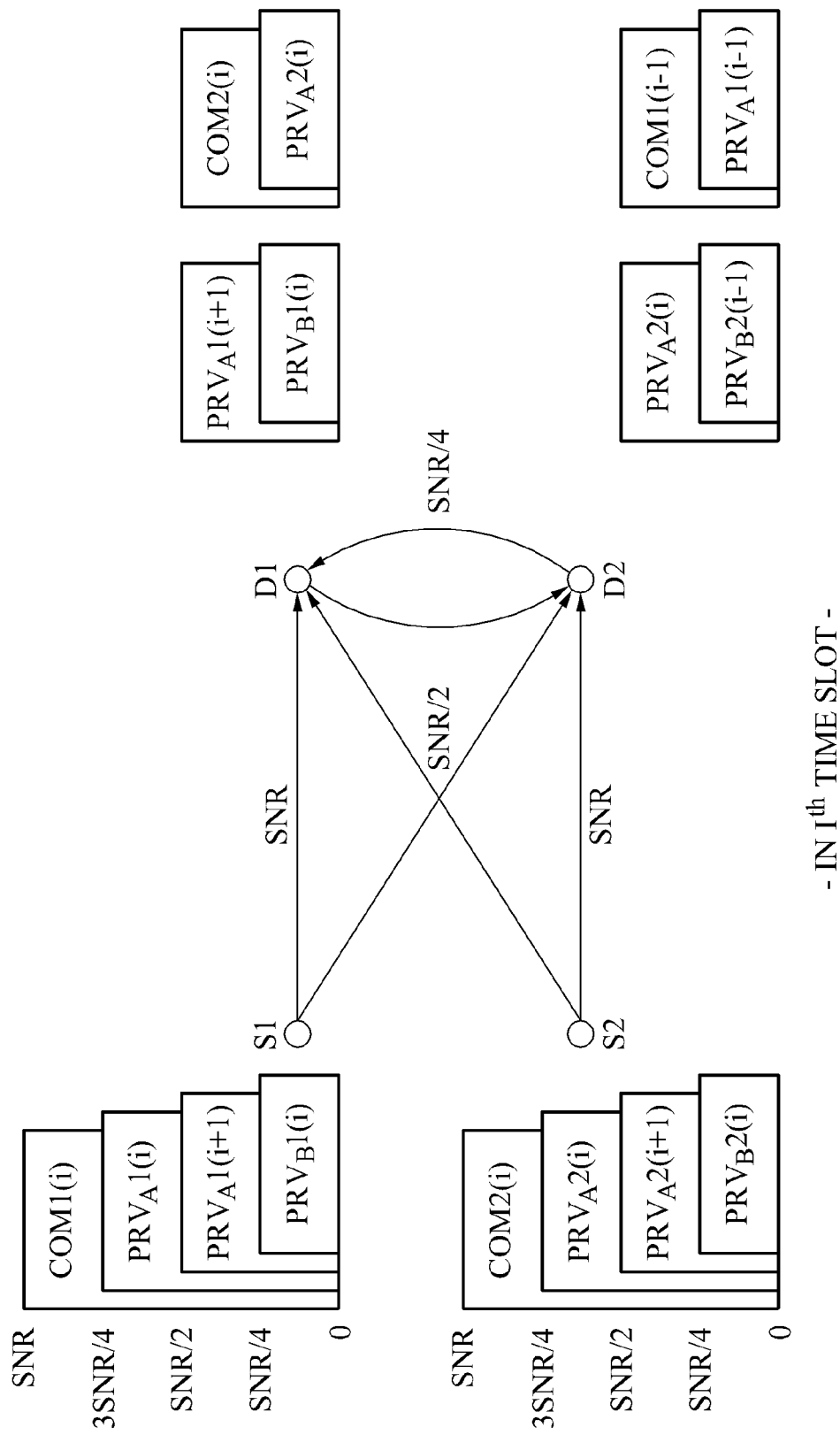
FIG. 9 is a diagram illustrating another example of a destination that removes a sub-message.

FIG. 9 illustrates another example of a destination that removes a sub-message. In this example, destination 1 removes a sub-message $PRV_A1(i)$ in an i$^{th}$ time slot.

Referring to FIG. 9, the destination 1 may decode a 2-1-(i)$^{th}$ sub-message ($PRV_A1(i)$) having a highest power among remaining five sub-messages in the i$^{th}$ time slot. In one example, the destination 1 may decode the 2-1-(i)$^{th}$ sub-message ($PRV_A1(i)$) while regarding remaining four sub-messages as a noise, and may eliminate the 2-1-(i)$^{th}$ sub-message ($PRV_A1(i)$).

When the 2-1-(i)$^{th}$ sub-message ($PRV_A1(i)$) is eliminated, only the four sub-messages remain in the destination 1.

Figure 10:
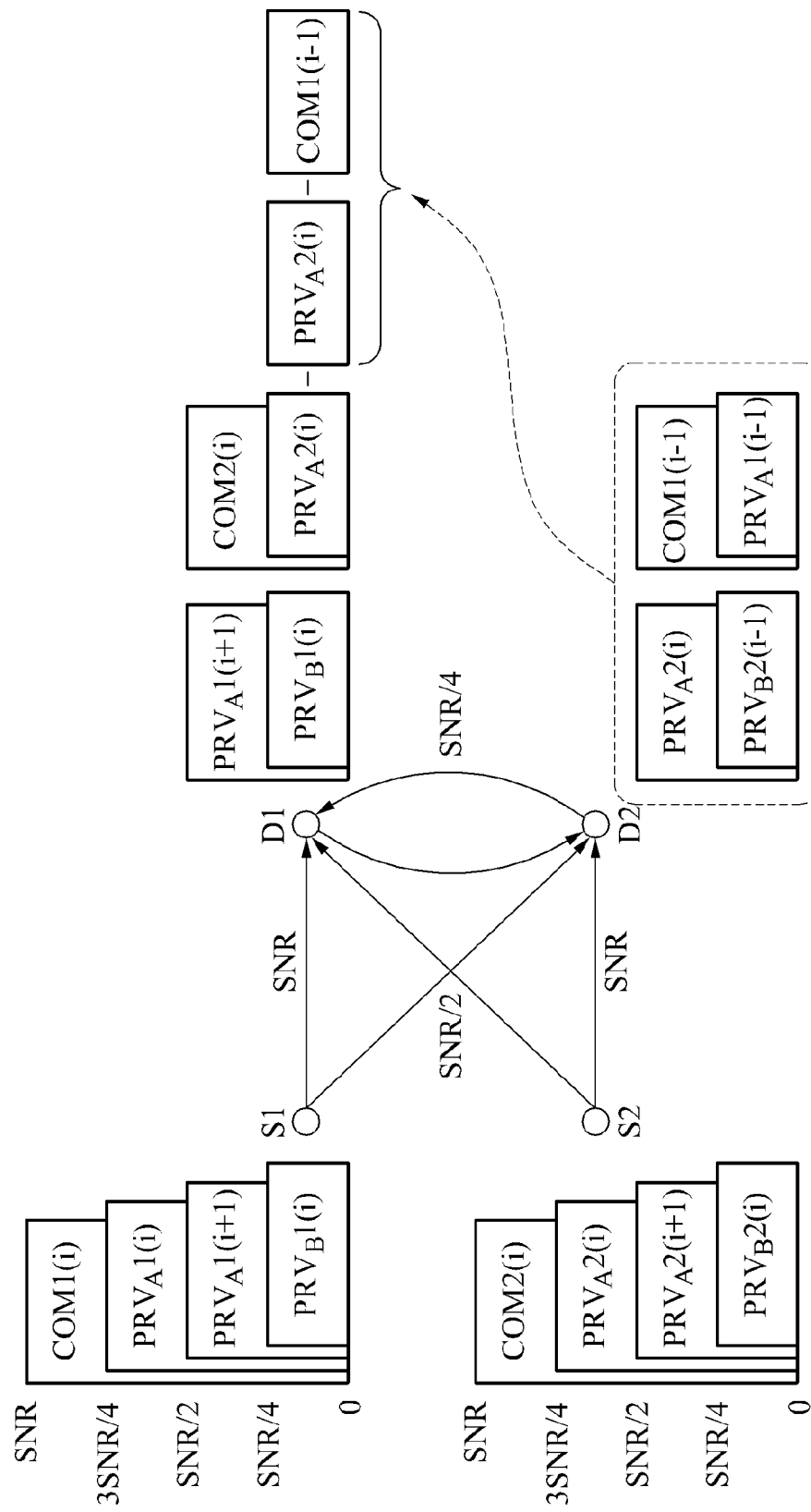
FIG. 10 is a diagram illustrating an example of a destination that provides several sub-messages to another destination.

FIG. 10 illustrates an example of a destination that provides several sub-messages to another destination. In this example, destination 2 provides several sub-messages to destination 1 in an i$^{th}$ time slot.

Referring to FIG. 10, the destination 2 may provide, to the destination 1, remaining four sub-messages after being received in the i−1$^{th}$ time slot. In one example, the four sub-messages may be combined together and may be transmitted in a form of an analog signal. For example, the destination 2 may accurately adjust a time synchronization and a phase synchronization of the four sub-messages to enable the destination 1 to effectively perform an analog-elimination, and may provide the four sub-messages to the destination 1.

In one example, a 3-2-(i−1)$^{th}$ sub-message ($PRV_B2(i-1)$) and a 2-1-(i−1)$^{th}$ sub-message ($PRV_A1(i-1)$) having a weak power may be regarded as a noise in the destination 1 due to a path loss between the destination 1 and the destination 2 while the four sub-messages are transmitted to the destination 1. Accordingly, the destination 1 may only receive a 2-2-(i)$^{th}$ sub-message ($PRV_A2(i)$) and a 1-1-(i−1)$^{th}$ sub-message (COM1(i−1)).

Figure 11:
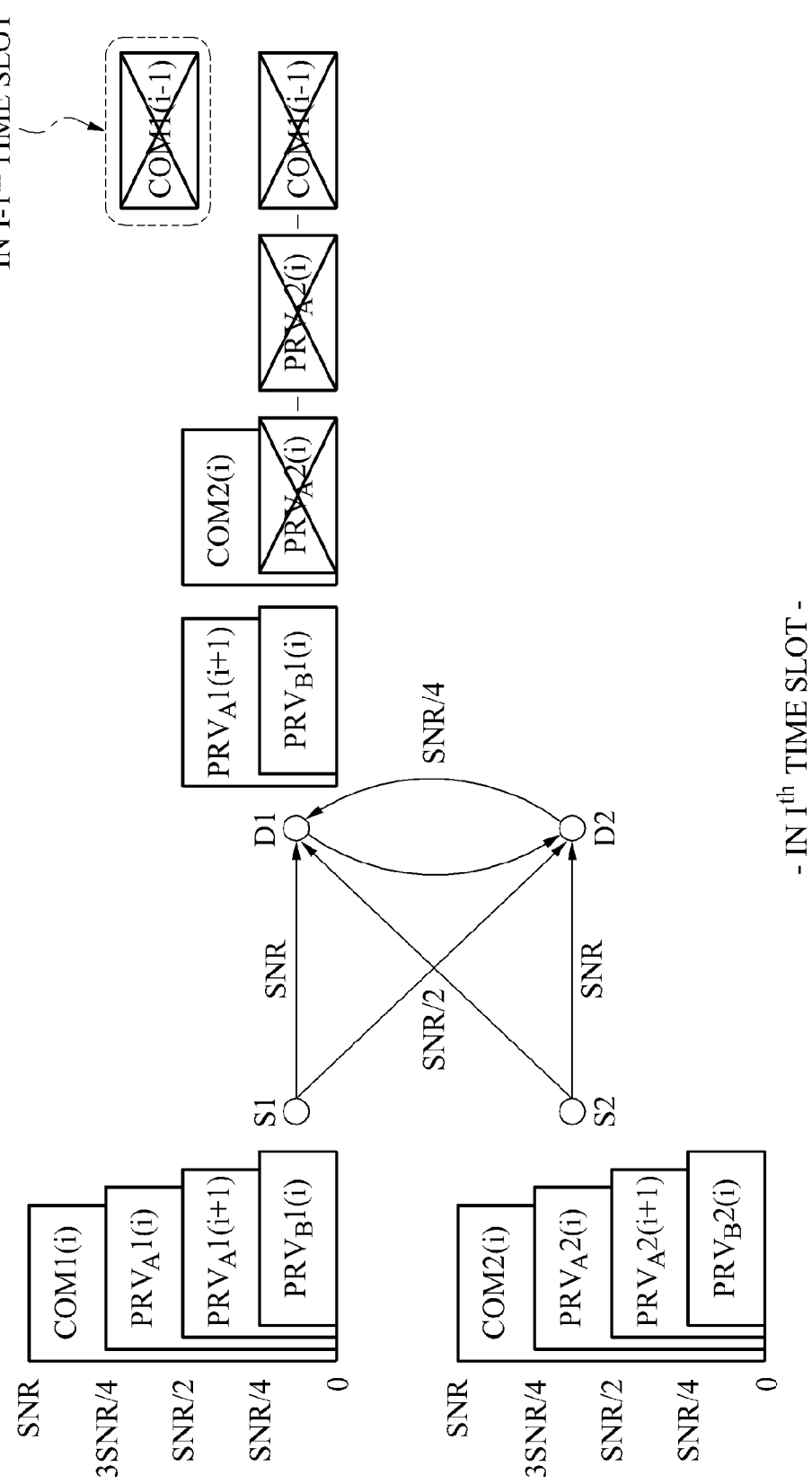
FIG. 11 is a diagram illustrating an example of a destination that removes a sub-message using sub-messages received from another destination.

FIG. 11 illustrates that a destination 1 eliminates a sub-message $PRV_A2(i)$ using sub-messages received from destination 2 in an i$^{th}$ time slot.

Referring to FIG. 11, the destination 1 eliminates a 2-2-(i)$^{th}$ sub-message ($PRV_A2(i)$) from remaining four sub-messages using sub-messages provided by the destination 1. In one example, the destination 1 may already know a 1-1-(i−1)$^{th}$ sub-message (COM1(i−1)) received in an i−1$^{th}$ time slot. Accordingly, the destination 1 may sum the remaining four messages and the 1-1-(i−1)$^{th}$ sub-message (COM1(i−1)) and may subtract the two sub-messages received from the destination 1, eliminating the 2-2-(i)$^{th}$ sub-message ($PRV_A2(i)$) from the remaining four sub-messages.

Therefore, three sub-messages may only remain in the destination 1. For example, a 2-1-(i+1)$^{th}$ sub-message ($PRV_A1(i+1)$), a 3-1-(i)$^{th}$ sub-message ($PRV_B1(i)$), and a 1-2-(i)$^{th}$ sub-message (COM2(i)) may only remain in the destination 1.

Figure 12:
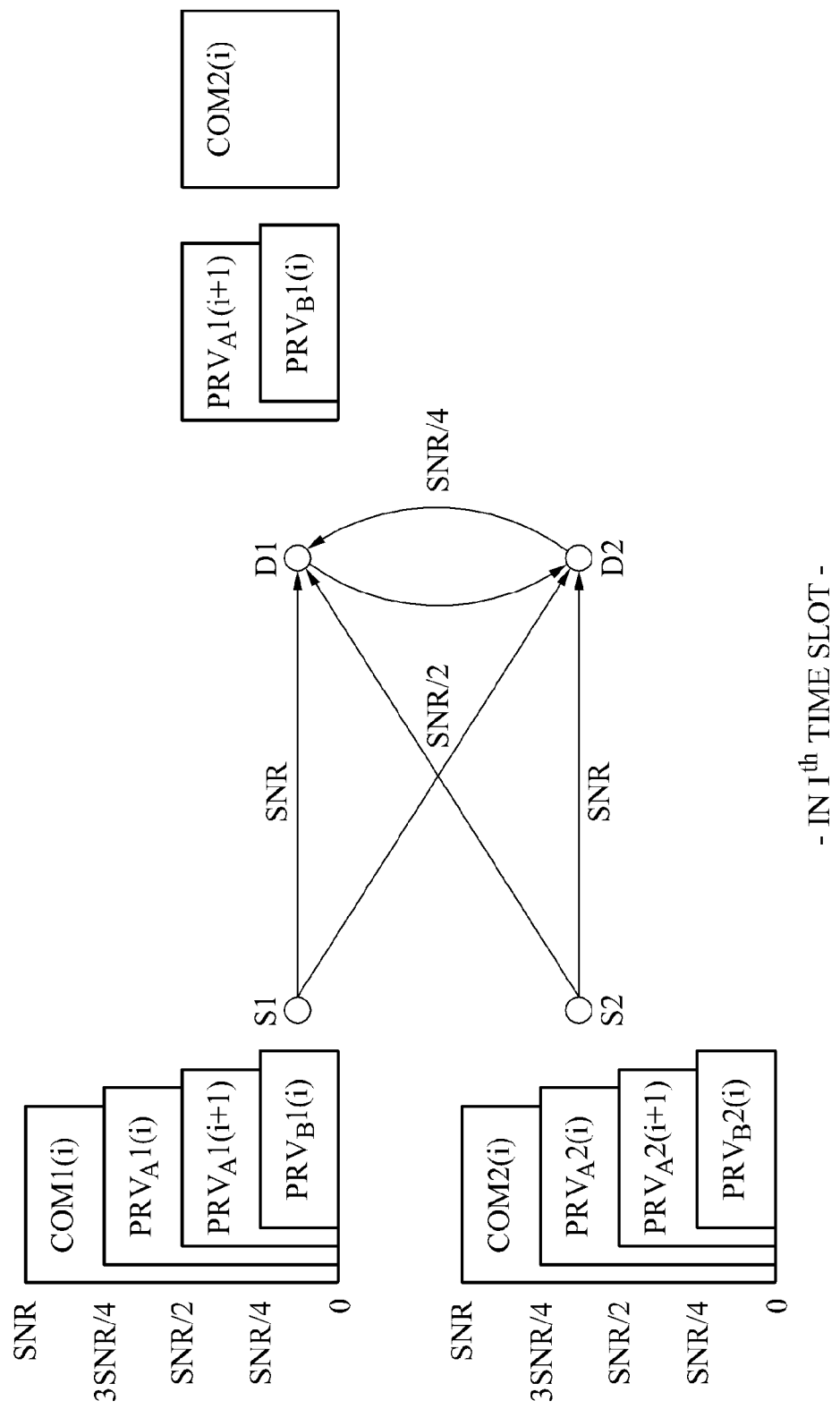
FIG. 12 is a diagram illustrating an example of sub-messages remaining in a destination after a sub-message is removed.

FIG. 12 illustrates sub-messages remaining in a destination 1 after a sub-message $PRV_A2(i)$ is eliminated in an i$^{th}$ time slot.

Referring to FIG. 12, a 2-1-(i+1)$^{th}$ sub-message ($PRV_A1(i+1)$), a 3-1-(i)$^{th}$ sub-message ($PRV_B1(i)$), and a 1-2-(i)$^{th}$ sub-message (COM2(i)) may only remain in the destination 1 in the i$^{th}$ time slot. In one example, a power of the 2-1-(i+1)$^{th}$ sub-message ($PRV_A1(i+1)$) and a power of the 1-2-(i)$^{th}$ sub-message (COM2(i)) are identical or are sufficiently identical, and thus, the destination 1 may not decode one of the 2-1-(i+1)$^{th}$ sub-message ($PRV_A1(i+1)$) and the 1-2-(i)$^{th}$ sub-message (COM2(i)).

Figure 13:
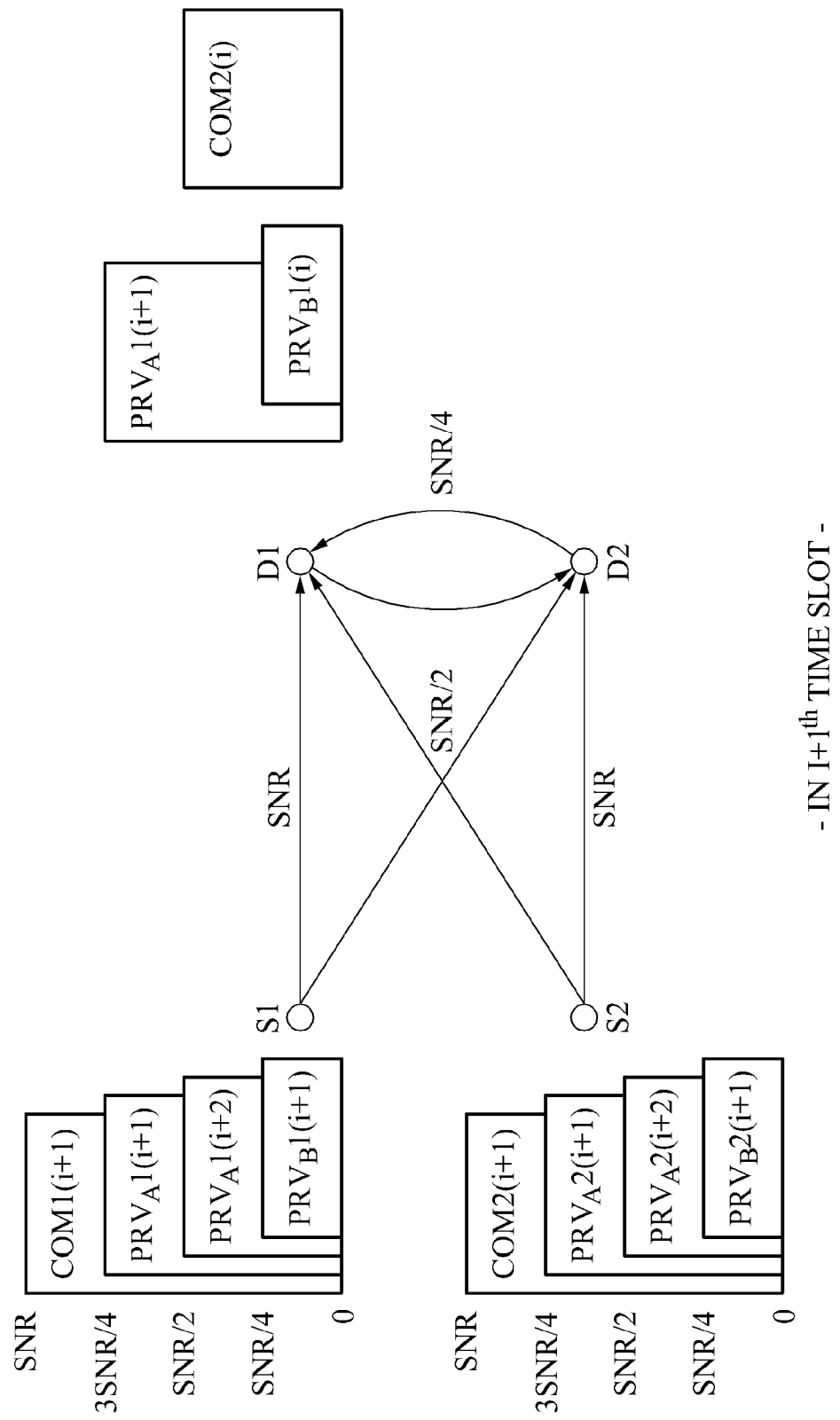
FIG. 13 is a diagram illustrating an example of a destination that receives an additional sub-message.

FIG. 13 illustrates that a destination 1 additionally receives a sub-message $PRV_A1(i+1)$ in an i+1$^{th}$ time slot.

Referring to FIG. 13, a source 1 may transmit a 1-1-(i+1)$^{th}$ sub-message (COM1(i+1)), a 2-1-(i+1)$^{th}$ sub-message ($PRV_A1(i+1)$), a 2-1-(i+2)$^{th}$ sub-message ($PRV_A1(i+2)$), and a 3-1-(i+1)$^{th}$ sub-message ($PRV_B1(i+1)$) in an i+1$^{th}$ time slot, and a source 2 may transmit a 1-2-(i+1)$^{th}$ sub-message (COM2(i+1)), a 2-2-(i+1)$^{th}$ sub-message ($PRV_A2(i+1)$), a 2-1-(i+2)$^{th}$ sub-message ($PRV_A2(i+2)$), and a 3-1-(i+1)$^{th}$ sub-message ($PRV_B2(i+1)$) in the $i+1^{th}$ time slot. In one example, the $2\text{-}1\text{-}(i+1)^{th}$ sub-message ($PRV_A1(i+1)$) is identical to a sub-message that is transmitted by the source 1 at a transmission power of SNR/2 in an $i^{th}$ time slot, and the $2\text{-}2\text{-}(i+1)^{th}$ sub-message ($PRV_A2(i+1)$) is identical to a sub-message that is transmitted by the source 2 at a transmission power of SNR/2 in the $i^{th}$ time slot.

In one example, the destination 1 may decode the $1\text{-}1\text{-}(i+1)^{th}$ sub-message (COM1(i+1)) and the $2\text{-}1\text{-}(i+1)^{th}$ sub-message ($PRV_A1(i+1)$), and thus, the $2\text{-}1\text{-}(i+1)^{th}$ sub-message ($PRV_A1(i+1)$) received in the $i+1^{th}$ time slot and the remaining $2\text{-}1\text{-}(i+1)^{th}$ sub-message ($PRV_A1(i+1)$) of FIG. 12 may be combined. Accordingly, a power of the $2\text{-}1\text{-}(i+1)^{th}$ sub-message ($PRV_A1(i+1)$) may be amplified as illustrated in FIG. 13.

Therefore, the destination 1 may have sub-messages having different powers.

Figure 14:
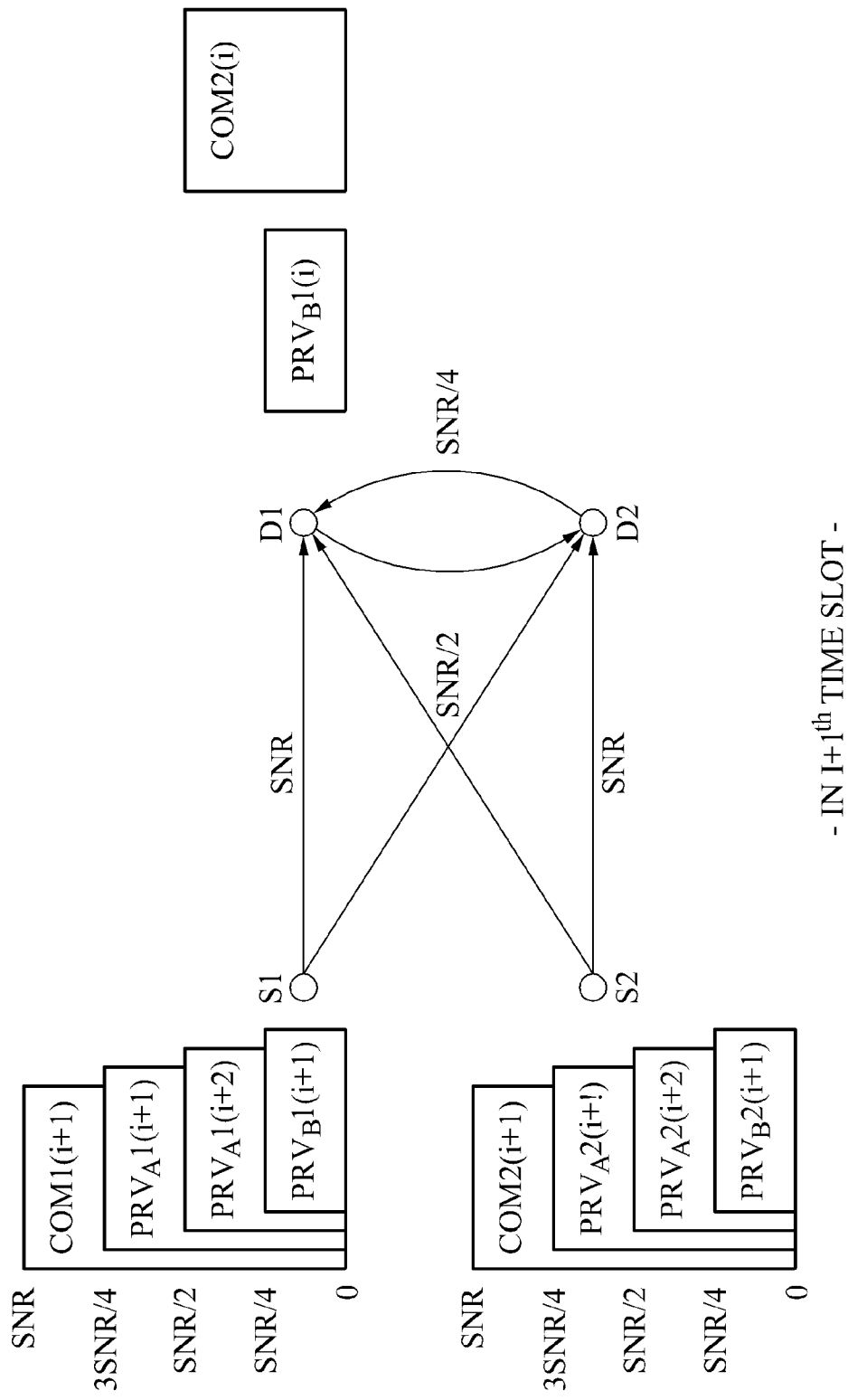
FIG. 14 is a diagram illustrating an example of a destination that eliminates a sub-message having an amplified power.

FIG. 14 illustrates that a destination 1 eliminates a $PRV_A1(i+1)$ having an amplified power.

Referring to FIG. 14, the destination 1 may decode a $2\text{-}1\text{-}(i+1)^{th}$ sub-message ($PRV_A1(i+1)$) having a strongest power among three sub-messages and may eliminate the decoded $2\text{-}1\text{-}(i+1)^{th}$ sub-message ($PRV_A1(i+1)$). Accordingly, only two sub-messages having different powers may remain in the destination 1.

For example, only a $3\text{-}1\text{-}(i)^{th}$ sub-message ($PRV_B1(i)$) and a $1\text{-}2\text{-}(i)^{th}$ sub-message (COM2(i)) may remain in the destination 1, after the $2\text{-}1\text{-}(i+1)^{th}$ sub-message ($PRV_A1(i+1)$) is eliminated.

Figure 15:
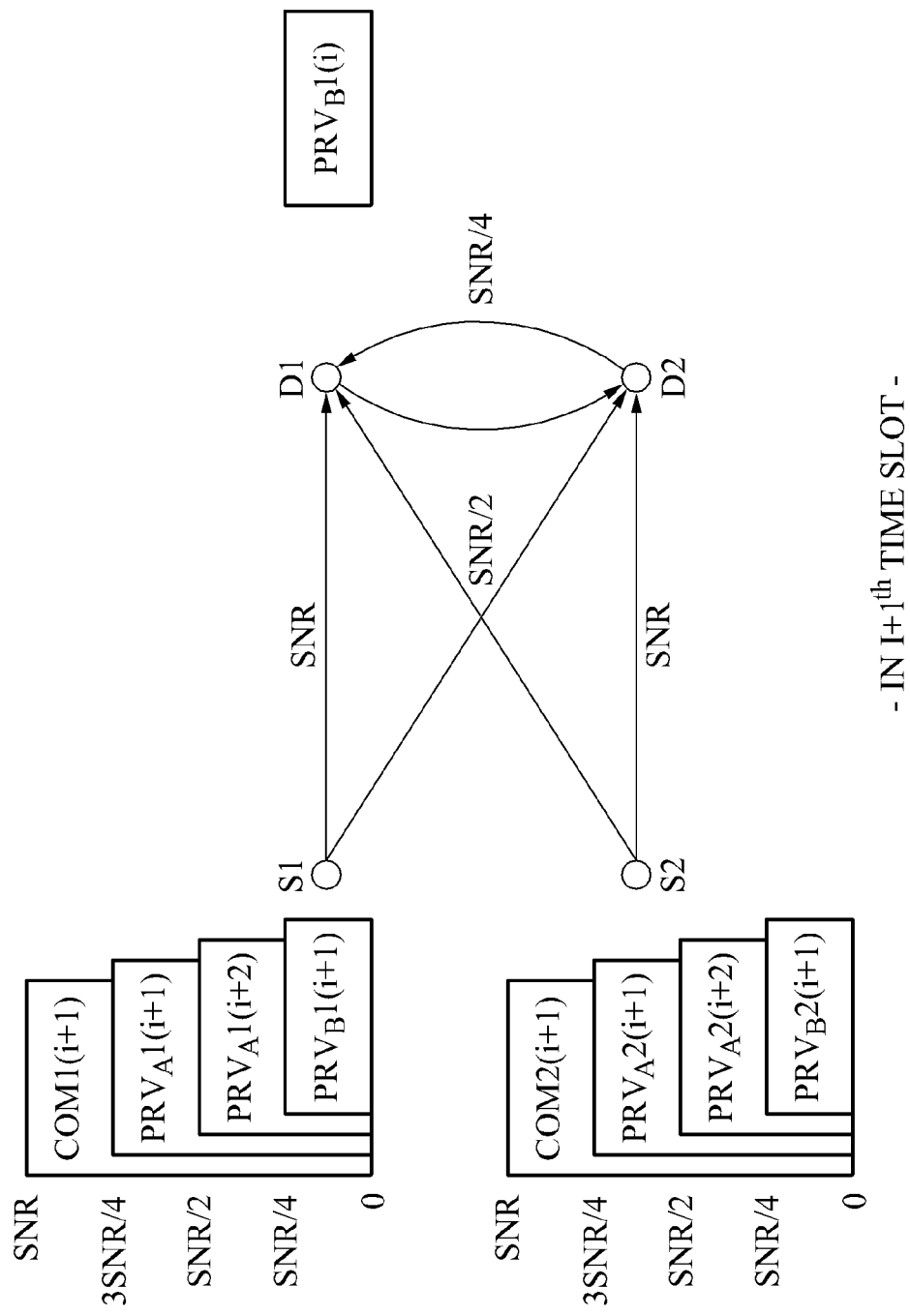
FIG. 15 is a diagram illustrating another example of a destination that removes a sub-message.

FIG. 15 illustrates that a destination 1 eliminates a COM2(i) in an $i+1^{th}$ time slot.

Referring to FIG. 15, the destination 1 may decode a $1\text{-}2\text{-}(i)^{th}$ sub-message (COM2(i)) having a stronger power among a $3\text{-}1\text{-}(i)^{th}$ sub-message ($PRV_B1(i)$) and the $1\text{-}2\text{-}(i)^{th}$ sub-message (COM2(i)), and eliminated the decoded $1\text{-}2\text{-}(i)^{th}$ sub-message (COM2(i)). Accordingly, only the $3\text{-}1\text{-}(i)^{th}$ sub-message ($PRV_B1(i)$) may remain in the destination 1.

Accordingly, the destination 1 may decode all desired sub-messages.

Figure 16:
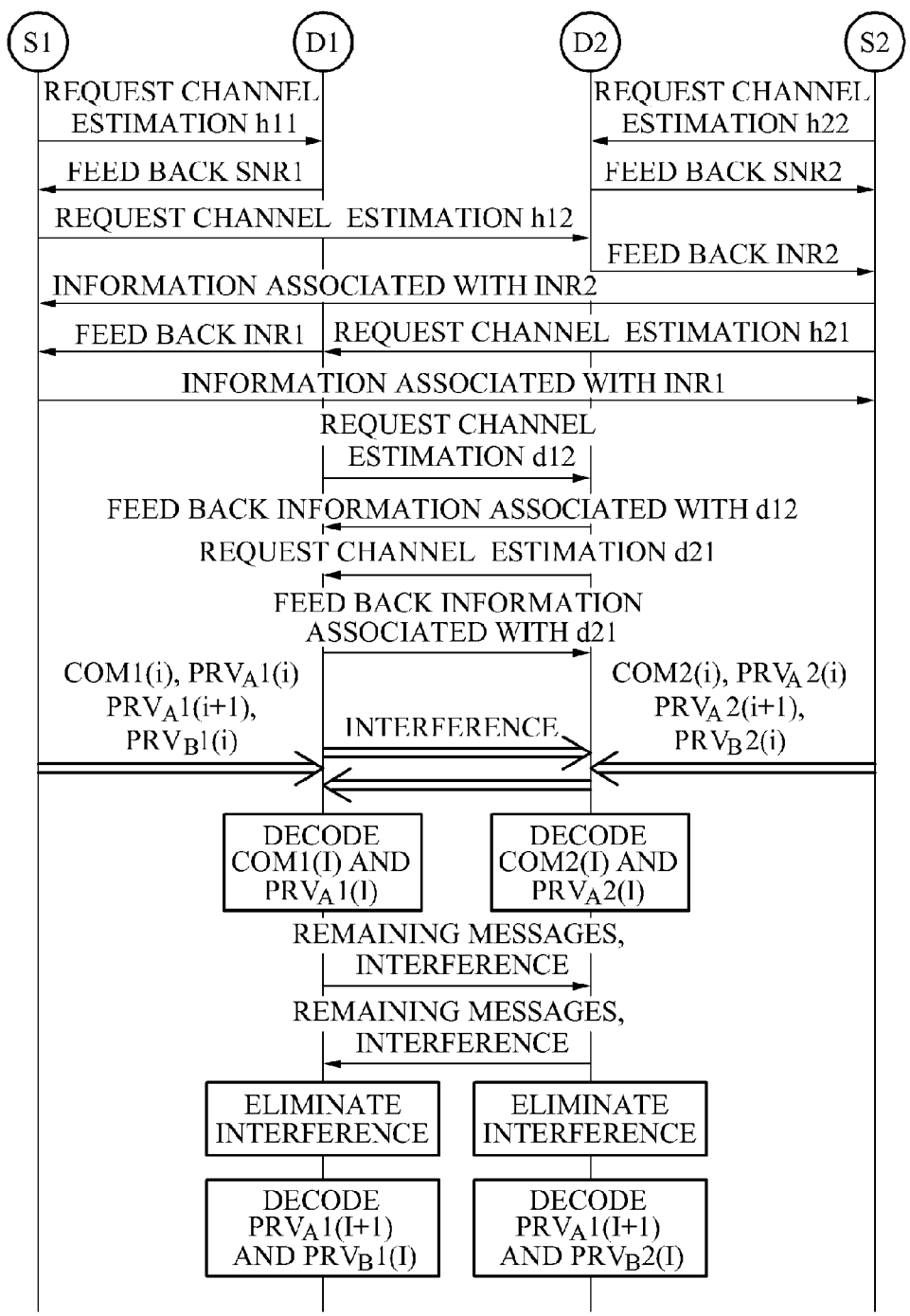
FIG. 16 is a flowchart illustrating an example method of interaction between a plurality of sources and a plurality of destinations.

FIG. 16 illustrates operation methods of a source 1, a source 2, a destination 1, and a destination 2.

Referring to FIGS. 2 through 16, each of the source 1 and the source 2 may recognize channel information prior to transmitting a message. The source 1 may request the destination 1 to estimate $h_{11}$ to recognize a strength of $h_{11}$. In one example, the destination 1 may feed back SNR1 to the source 1 after measuring SNR1, e.g., a strength of $h_{11}$. Also, the source 2 may request the destination 2 to estimate $h_{22}$, and the destination 2 may feed back SNR2 to the source 2 after measuring SNR2, e.g., a strength of $h_{22}$.

The source 1 may request the destination 2 to estimate an interference channel $h_{12}$, and the destination 2 may feed back, to the source 2, interference to Noise Ratio (INR2), e.g., a strength of the interference channel $h_{12}$, after measuring the INR2. The source 1 may also request the destination 1 to estimate an interference channel $h_{21}$, and the destination 1 may feed back INR1, e.g., a strength of the interference channel $h_{21}$, to the source 1 after measuring the INR1. Then, the source 1 and the source 2 may share INR1 and the INR2 with each other.

Also, the destination 1 and the destination 2 may request estimation of a channel between the destination 1 and the destination 2. The destination 1 and the destination 2 may share information associated with a strength of the channel.

Each of sources may construct a transmission message including four sub-messages after the sources and the destinations finish measuring or exchanging information associated with channels.

For example, the source 1 may transmit a $1\text{-}1\text{-}(i)^{th}$ sub-message (COM1(i)), a $2\text{-}1\text{-}(i)^{th}$ sub-message ($PRV_A1(i)$), a $2\text{-}1\text{-}(i+1)^{th}$ sub-message($PRV_A1(i+1)$), and a $3\text{-}1\text{-}(i)^{th}$ sub-message ($PRV_B1(i)$), and the source 2 may transmit a $1\text{-}2\text{-}(i)^{th}$ sub-message (COM2(i)), a $2\text{-}2\text{-}(i)^{th}$ sub-message ($PRV_A2(i)$), a $2\text{-}1\text{-}(i+1)^{th}$ sub-message ($PRV_A2(i+1)$), and a $3\text{-}1\text{-}(i)^{th}$ sub-message ($PRV_B2(i)$).

In one example, two sub-messages among the four sub-messages transmitted from the source 1 may act as interferences in the destination 2, and two sub-messages among the four sub-messages transmitted from the source 2 may act as interferences in the destination 1.

The destination 1 may decode two sub-messages having a strongest power among received six sub-messages, e.g., the $1\text{-}1\text{-}(i)^{th}$ sub-message (COM1(i)) and the $2\text{-}1\text{-}(i)^{th}$ sub-message ($PRV_A1(i)$), and may eliminate the $1\text{-}1\text{-}(i)^{th}$ sub-message (COM1(i)) and the $2\text{-}1\text{-}(i)^{th}$ sub-message ($PRV_A1(i)$). The destination 2 may also decode two sub-messages having a strongest power among received six sub-messages, e.g., the $1\text{-}2\text{-}(i)^{th}$ sub-message (COM2(i)) and the $2\text{-}2\text{-}(i)^{th}$ sub-message ($PRV_A2(i)$), and may eliminate the $1\text{-}2\text{-}(i)^{th}$ sub-message (COM2(i)) and the $2\text{-}2\text{-}(i)^{th}$ sub-message ($PRV_A2(i)$).

Each of the destination 1 and the destination 2 may share remaining sub-messages. The destination 1 may provide the remaining four sub-messages to the destination 2, and the destination 2 may provide the remaining four sub-messages to the destination 1.

The destination 1 may eliminate the interferences using sub-messages provided by the destination 2, and the destination 2 may eliminate the interferences using sub-messages provided by the destination 1.

Accordingly, the destination 1 may decode the $2\text{-}1\text{-}(i+1)^{th}$ sub-message ($PRV_A1(i+1)$) and the $3\text{-}1\text{-}(i)^{th}$ sub-message ($PRV_B1(i)$), and the destination 2 may decode the $2\text{-}1\text{-}(i+1)^{th}$ sub-message ($PRV_A2(i+1)$) and the $3\text{-}1\text{-}(i)^{th}$ sub-message ($PRV_B2(i)$).

Therefore, the destination 1 and the destination 2 may decode all desired sub-messages.

The method according to the above-described example embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD-ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. In addition, a computer-readable storage medium may be distributed among computer systems connected through a network and computer-readable codes or program instructions may be stored and executed in a decentralized manner.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a receiver corresponding to a second transmitter, the method comprising:
   receiving a $1\text{-}1\text{-}(i-1)^{th}$ sub-message and a $2\text{-}1\text{-}(i-1)^{th}$ sub-message from among the $1\text{-}1\text{-}(i-1)^{th}$ sub-message, the $2\text{-}1\text{-}(i-1)^{th}$ sub-message, a $2\text{-}1\text{-}(i)^{th}$ sub-message, and a $3\text{-}1\text{-}(i-1)^{th}$ sub-message transmitted from a first transmitter based on different transmission powers in a $(i-1)^{th}$ time slot;
   receiving a $1\text{-}2\text{-}(i-1)^{th}$ sub-message, a $2\text{-}2\text{-}(i-1)^{th}$ sub-message, a $2\text{-}2\text{-}(i)^{th}$ sub-message, and a $3\text{-}2\text{-}(i-1)^{th}$ sub-message transmitted from the second transmitter based on different transmission powers in the $(i-1)^{th}$ time slot;
   decoding the $1\text{-}2\text{-}(i-1)^{th}$ sub-message and the $2\text{-}2\text{-}(i-1)^{th}$ sub-message;
   eliminating the $1\text{-}2\text{-}(i-1)^{th}$ sub-message and the $2\text{-}2\text{-}(i-1)^{th}$ sub-message from the received sub-messages; and
   providing, to a receiver corresponding to the first transmitter, the $1\text{-}1\text{-}(i-1)^{th}$ sub-message, the $2\text{-}1\text{-}(i-1)^{th}$ sub-message, the $2\text{-}2\text{-}(i)^{th}$ sub-message and the $3\text{-}2\text{-}(i-1)^{th}$ sub-message.

2. The method of claim 1, further comprising:
   estimating an interference channel between the first transmitter and the receiver corresponding to the second transmitter; and
   reporting information associated with the interference channel to at least one of the first transmitter and the second transmitter.

3. The method of claim 1, wherein the providing performs:
   adjusting a time synchronization or a phase synchronization of each of the $1\text{-}1\text{-}(i-1)^{th}$ sub-message, the $2\text{-}1\text{-}(i-1)^{th}$ sub-message, the $2\text{-}2\text{-}(i)^{th}$ sub-message, and the $3\text{-}2\text{-}(i-1)^{th}$ sub-message; and
   providing, as an analog signal, the $1\text{-}1\text{-}(i-1)^{th}$ sub-message, the $2\text{-}1\text{-}(i-1)^{th}$ sub-message, the $2\text{-}2\text{-}(i)^{th}$ sub-message, and the $3\text{-}2\text{-}(i-1)^{th}$ sub-message, to the receiver corresponding to the first transmitter.

4. The method of claim 1, wherein:
   transmission powers of the $1\text{-}1\text{-}(i-1)^{th}$ sub-message, the $2\text{-}1\text{-}(i-1)^{th}$ sub-message, the $2\text{-}1\text{-}(i)^{th}$ sub-message, and the $3\text{-}1\text{-}(i-1)^{th}$ sub-message transmitted in the $(i-1)^{th}$ time slot are transmission powers A, B, C, and D [W], respectively;
   A, B, C, and D denote real numbers; and
   $A>B>C>D$.

5. A communication method of a receiver corresponding to a first transmitter, the method comprising:
   distinguishing a $1\text{-}1\text{-}(i-1)^{th}$ sub-message, a $2\text{-}1\text{-}(i-1)^{th}$ sub-message, and a $2\text{-}2\text{-}(i)^{th}$ sub-message from among the $1\text{-}1\text{-}(i-1)^{th}$ sub-message, the $2\text{-}1\text{-}(i-1)^{th}$ sub-message, the $2\text{-}2\text{-}(i)^{th}$ sub-message, and a $3\text{-}2\text{-}(i-1)^{th}$ sub-message transmitted from a receiver corresponding to a second transmitter, in response to:
   the first transmitter transmitting the $1\text{-}1\text{-}(i-1)^{th}$ sub-message, the $2\text{-}1\text{-}(i-1)^{th}$ sub-message, the $2\text{-}1\text{-}(i)^{th}$ sub-message, and a $3\text{-}1\text{-}(i-1)^{th}$ sub-message; and
   the second transmitter transmitting the $1\text{-}2\text{-}(i-1)^{th}$ sub-message, the $2\text{-}2\text{-}(i-1)^{th}$ sub-message, the $2\text{-}2\text{-}(i)^{th}$ sub-message, and a $3\text{-}2\text{-}(i-1)^{th}$ sub-message in an $(i-1)^{th}$ time slot;
   receiving a $1\text{-}1\text{-}(i)^{th}$ sub-message, the $2\text{-}1\text{-}(i)^{th}$ sub-message, a $2\text{-}1\text{-}(i+1)^{th}$ sub-message, and a $3\text{-}1\text{-}(i)^{th}$ sub-message from the first transmitter in an $(i)^{th}$ time slot;
   receiving a $1\text{-}2\text{-}(i)^{th}$ sub-message, and the $2\text{-}2\text{-}(i)^{th}$ sub-message from the second transmitter in the $(i)^{th}$ time slot; and
   extracting the $1\text{-}1\text{-}(i)^{th}$ sub-message, the $2\text{-}1\text{-}(i)^{th}$ sub-message, and the $3\text{-}1\text{-}(i)^{th}$ sub-message from the sub-messages received in the $(i)^{th}$ time slot, using the $1\text{-}2\text{-}(i)^{th}$ sub-message and the $2\text{-}2\text{-}(i)^{th}$ sub-message received from the receiver corresponding to the second transmitter.

6. The method of claim 5, wherein the extracting performs:
   extracting the $1\text{-}1\text{-}(i)^{th}$ sub-message and the $2\text{-}1\text{-}(i)^{th}$ sub-message based on a transmission power of each of the sub-messages received in the $(i)^{th}$ time slot; and
   eliminating the $1\text{-}2\text{-}(i)^{th}$ sub-message from remaining sub-messages, excluding the $1\text{-}1\text{-}(i)^{th}$ sub-message and the $2\text{-}1\text{-}(i)^{th}$ sub-message among the sub-messages received in the $(i)^{th}$ time slot.

7. The method of claim 6, wherein the extracting sequentially eliminates the $2\text{-}1\text{-}(i+1)^{th}$ sub-message and the $1\text{-}2\text{-}(i)^{th}$ sub-message to extract the $3\text{-}1\text{-}(i)^{th}$ sub-message, after the $1\text{-}2\text{-}(i)^{th}$ sub-message is eliminated from the remaining sub-messages.

* * * * *